United States Patent
Yamazaki et al.

(10) Patent No.: US 9,163,672 B2
(45) Date of Patent: Oct. 20, 2015

(54) FIXED CONSTANT VELOCITY UNIVERSAL JOINT

(75) Inventors: Kenta Yamazaki, Iwata (JP); Kisao Yamazaki, Iwata (JP); Teruaki Fujio, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/115,137

(22) PCT Filed: May 2, 2012

(86) PCT No.: PCT/JP2012/061585
§ 371 (c)(1),
(2), (4) Date: Nov. 1, 2013

(87) PCT Pub. No.: WO2012/165096
PCT Pub. Date: Dec. 6, 2012

(65) Prior Publication Data
US 2014/0073441 A1    Mar. 13, 2014

(30) Foreign Application Priority Data

| May 30, 2011 | (JP) | 2011-120539 |
| May 30, 2011 | (JP) | 2011-120540 |
| Nov. 1, 2011 | (JP) | 2011-240391 |
| Nov. 1, 2011 | (JP) | 2011-240393 |

(51) Int. Cl.
*F16D 3/223* (2011.01)
*F16D 3/24* (2006.01)
(Continued)

(52) U.S. Cl.
CPC .. *F16D 3/24* (2013.01); *F16D 3/20* (2013.01); *F16D 3/2233* (2013.01)

(58) Field of Classification Search
CPC ............ F16D 3/20; F16D 3/2233; F16D 3/24
USPC .......................................... 464/144, 145, 906
See application file for complete search history.

(56) References Cited

U.S. PATENT DOCUMENTS

| 2,319,100 A | * | 5/1943 | Anderson ..................... 464/144 |
| 6,319,133 B1 | | 11/2001 | Schwärzler et al. |

(Continued)

FOREIGN PATENT DOCUMENTS

| CN | 101410644 | 4/2009 |
| CN | 101517255 | 8/2009 |

(Continued)

OTHER PUBLICATIONS

International Preliminary Report on Patentability and Written Opinion of the International Searching Authority issued Dec. 12, 2013 in International (PCT) Application No. PCT/JP2012/061585.

(Continued)

*Primary Examiner* — Gregory Binda
(74) *Attorney, Agent, or Firm* — Wenderoth, Lind & Ponack, L.L.P.

(57) ABSTRACT

A fixed type constant velocity universal joint has track grooves of an outer joint member including first and second track groove portions located on depth and opening sides, respectively. The first track groove portions each have a circular-arc part having a curvature center that is not offset in an axial direction with respect to a joint center, are inclined in a circumferential direction with respect to a joint axial line, and are adjacent to each other in the circumferential direction with their inclination directions opposite to each other. The second track groove portions have a different shape than the first track groove portions to increase an effective track length with respect to a maximum operating angle. The first and second track groove portions are connected respectively to each other on the opening side with respect to the joint center.

13 Claims, 17 Drawing Sheets

(51) Int. Cl.
*F16D 3/2233* (2011.01)
*F16D 3/20* (2006.01)

(56) References Cited

U.S. PATENT DOCUMENTS

| | | | | |
|---|---|---|---|---|
| 6,468,164 | B2* | 10/2002 | Song | 464/144 |
| 2001/0046900 | A1 | 11/2001 | Song | |
| 2009/0054166 | A1 | 2/2009 | Hoshino et al. | |
| 2010/0016086 | A1 | 1/2010 | Sone et al. | |
| 2010/0029396 | A1 | 2/2010 | Fujio et al. | |
| 2014/0080613 | A1* | 3/2014 | Hirukawa et al. | 464/145 |
| 2014/0243104 | A1* | 8/2014 | Yamazaki et al. | 464/145 |
| 2014/0329608 | A1* | 11/2014 | Yamazaki et al. | 464/145 |

FOREIGN PATENT DOCUMENTS

| | | |
|---|---|---|
| CN | 101606001 | 12/2009 |
| JP | 2000-509799 | 8/2000 |
| JP | 2007-218353 | 8/2007 |
| JP | 2008-69889 | 3/2008 |
| JP | 2009-250365 | 10/2009 |

OTHER PUBLICATIONS

International Search Report issued Aug. 14, 2012 in International (PCT) Application No. PCT/JP2012/061585.
Chinese Office Action issued Jun. 18, 2015 in corresponding Chinese Patent Application No. 201280026249.9 with English translation.

* cited by examiner

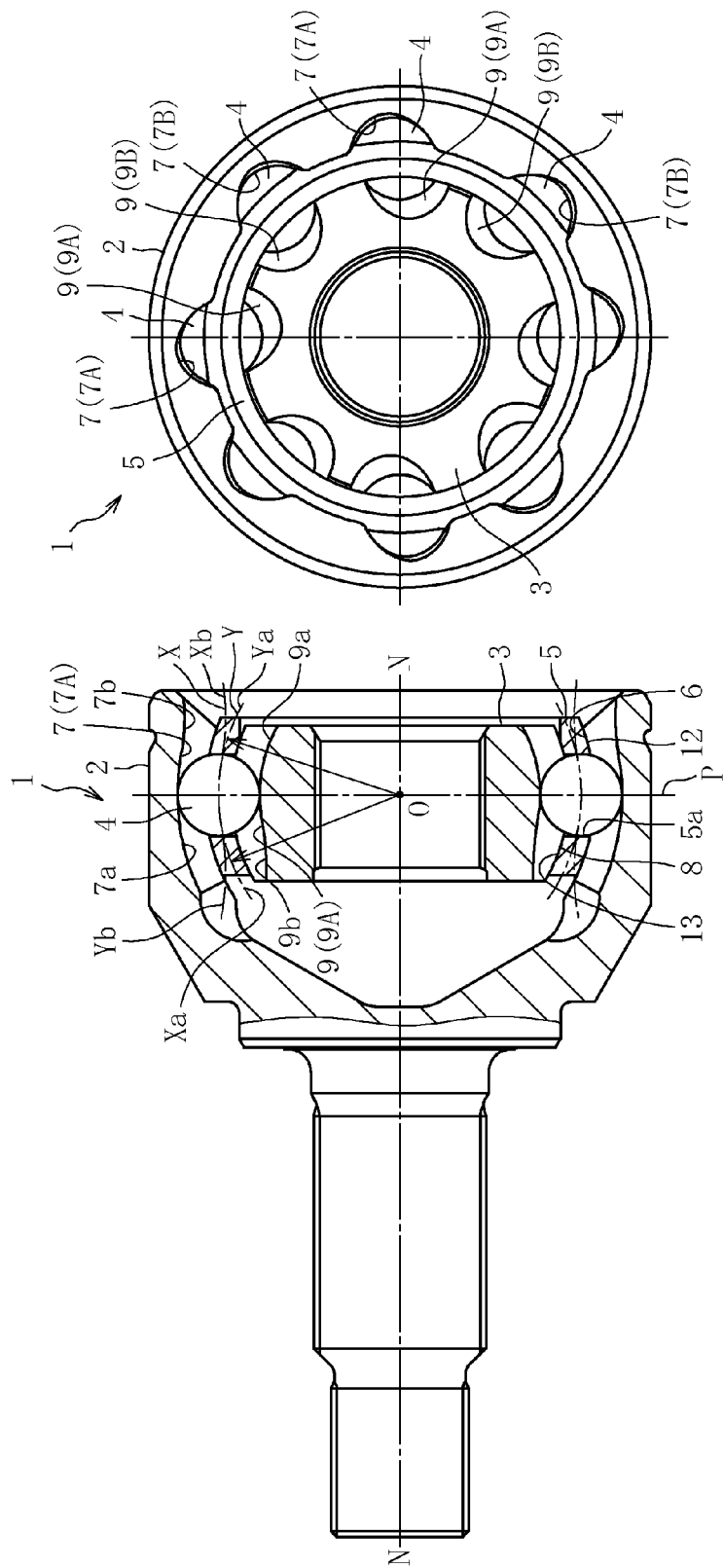

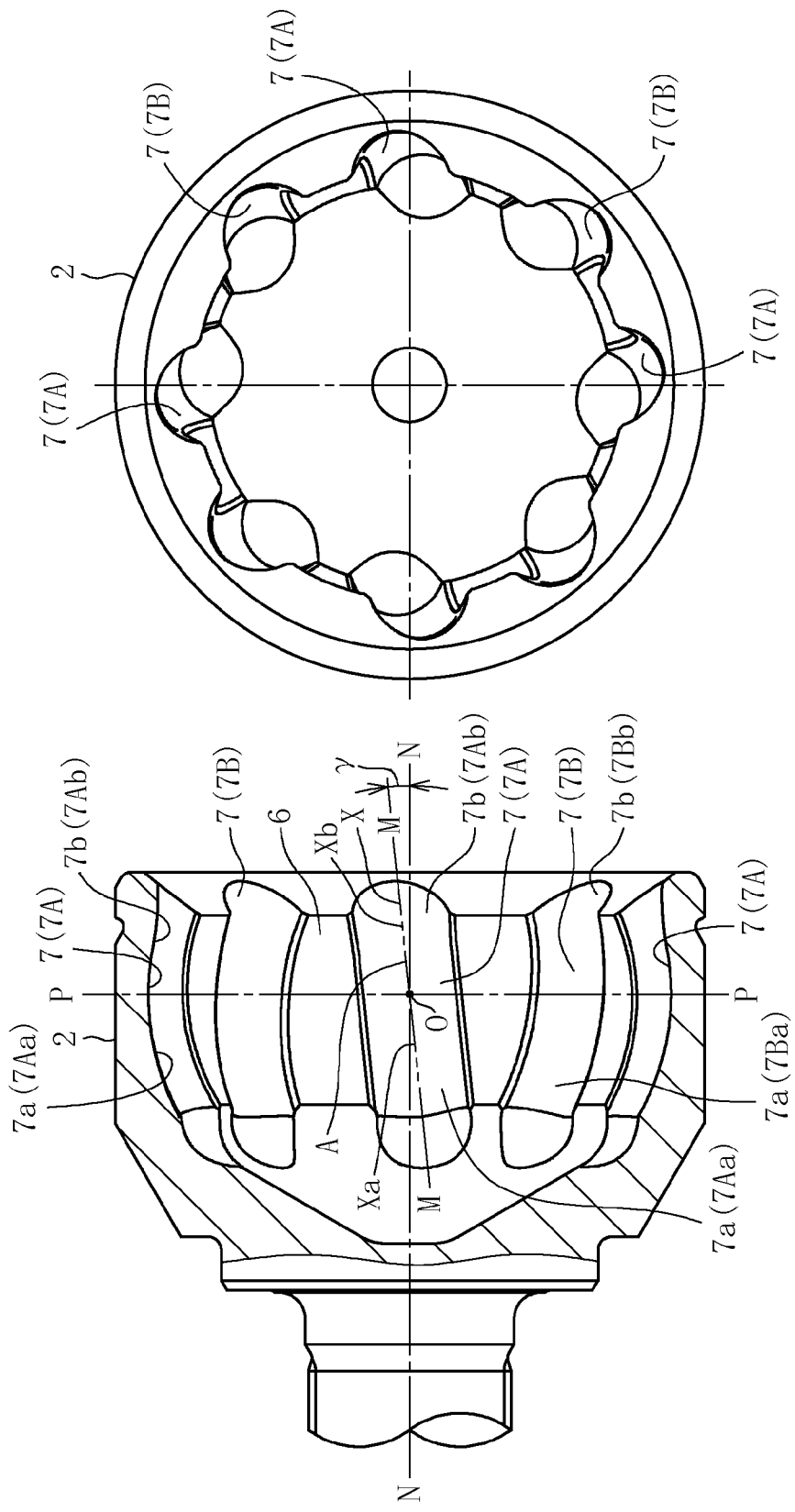

FIXED CONSTANT VELOCITY UNIVERSAL JOINT

TECHNICAL FIELD

The present invention relates to a fixed type constant velocity universal joint, and more specifically, to a fixed type constant velocity universal joint that is used in a power transmission system for automobiles and various industrial machines and allows only angular displacement between two shafts on a driving side and a driven side.

BACKGROUND ART

For example, a plunging type constant velocity universal joint that is capable of axial displacement while forming an operating angle including a relatively low maximum operating angle is assembled normally on an inboard side (differential side) of a front drive shaft of an automobile. On an outboard side (wheel side), a fixed type constant velocity universal joint that is capable of forming high operating angles but is not displaced in the axial direction is assembled in consideration of steering of the wheel.

FIGS. 19a and 19b illustrate a Rzeppa type constant velocity universal joint 101 as an example of the fixed type constant velocity universal joint used on the outboard side. FIG. 19(a) is a vertical sectional view illustrating a state in which an operating angle is set to 0°, and FIG. 19(b) is a schematic view illustrating a state in which a maximum operating angle is formed. As illustrated in FIG. 19(a), the constant velocity universal joint 101 includes, as main components, an outer joint member 102, an inner joint member 103, balls 104, and a cage 105. The outer joint member 102 has a spherical inner peripheral surface 106 including eight track grooves 107 formed equiangularly along an axial direction. The inner joint member 103 has a spherical outer peripheral surface 108 including track grooves 109 formed equiangularly along the axial direction so as to face the track grooves 107 of the outer joint member 102. Eight balls 104 for transmitting torque are interposed between the track grooves 107 of the outer joint member 102 and the track grooves 109 of the inner joint member 103. The cage 105 for holding the balls 104 is arranged between the spherical inner peripheral surface 106 of the outer joint member 102 and the spherical outer peripheral surface 108 of the inner joint member 103. An outer periphery of the outer joint member 102 and an outer periphery of a shaft coupled to the inner joint member 103 are covered with a boot, and grease as a lubricant is sealed inside the joint (none of which is shown).

As illustrated in FIG. 19(a), the cage 105 has a spherical outer peripheral surface 112 fitted to the spherical inner peripheral surface 106 of the outer joint member 102, and a spherical inner peripheral surface 113 fitted to the spherical outer peripheral surface 108 of the inner joint member 103. The spherical outer peripheral surface 112 and the spherical inner peripheral surface 113 each have a curvature center formed at a joint center O. On the other hand, a curvature center Oo of a ball-raceway center line x of the track groove 107 of the outer joint member 102 and a curvature center Oi of a ball-raceway center line y of the track groove 109 of the inner joint member 103 are offset in the axial direction by equal distances with respect to the joint center O. With this, when the joint forms an operating angle, the balls 104 are always guided in a plane obtained by bisection of an angle formed between axial lines of the outer joint member 102 and the inner joint member 103. As a result, rotational torque is transmitted at a constant velocity between the two axes.

As illustrated in FIG. 19(b), a maximum operating angle $\theta_{max}$, which may be set as a main function of the fixed type constant velocity universal joint 101, depends on an angle at which an inlet chamfer 110 provided at an opening rim of the outer joint member 102 and a shaft 111 interfere with each other. In order to secure permissible torque to be transmitted, the shaft 111 has an axial diameter d set on a joint-size basis. When a large inlet chamfer 110 is formed, a length of the track groove 107 of the outer joint member 102, on which the ball 104 is brought into abutment (hereinafter referred to as "effective track length"), is insufficient. As a result, the ball 104 drops off the track groove 107, and rotational torque cannot be transmitted. Thus, how the inlet chamfer 110 is formed while securing the effective track length of the outer joint member 102 is an important factor in securing the operating angle. In the Rzeppa type constant velocity universal joint 101, the curvature center Oo of the ball-raceway center line X of the track groove 107 of the outer joint member 102 is offset to an opening side, and hence there is an advantage in terms of the maximum operating angle. However, the maximum operating angle $\theta_{max}$ is approximately 47°.

Further, in comparison with a conventional six-ball constant velocity universal joint, the Rzeppa type constant velocity universal joint 101 of an eight-ball type has a smaller track offset amount, a larger number of balls, and a smaller diameter. Thus, it is possible to provide a high-efficient constant velocity universal joint that is lightweight and compact, and suppresses torque loss. However, at the operating angle of 0°, wedge angles formed between the track grooves 107 and 109 of the outer joint member 102 and the inner joint member 103, which face each other, are opened toward the opening side of the outer joint member 102. Thus, due to forces applied in the axial direction from the track grooves 107 and 109 to the balls, loads to be applied to the spherical contact portions 106 and 112 of the outer joint member 102 and the cage 105 and the spherical contact portions 108 and 113 of the inner joint member 103 and the cage 105 are generated in a certain direction. Thus, this configuration leads to restriction on a further increase in efficiency and suppression of heat generation.

In order to achieve much higher efficiency and less heat generation than those can be achieved by the Rzeppa type constant velocity universal joint 101 of the eight-ball type described above, there has been proposed a fixed type constant velocity universal joint of a track groove crossing type (Patent Document 1). This constant velocity universal joint is illustrated in FIGS. 20(a) and 20(b). FIG. 20(a) is a vertical sectional view illustrating a state in which the operating angle is set to 0°, and FIG. 20(b) is a schematic view illustrating a state in which a high operating angle is formed. As illustrated in FIG. 20(a), the constant velocity universal joint 121 includes, as main components, an outer joint member 122, an inner joint member 123, balls 124, and a cage 125. The constant velocity universal joint 121 is a constant velocity universal joint of the track groove crossing type. Although not shown, planes each including the ball-raceway center line x of corresponding one of eight track grooves 127 of the outer joint member 122 are inclined with respect to a joint axial line n-n, and inclination directions of the planes defined in the track grooves 127 that are adjacent to each other in the circumferential direction are set opposite to each other. Further, track grooves 129 of the inner joint member 123 each have the ball-raceway center line y formed to be mirror-image symmetrical with the ball-raceway center line x of corresponding one of the paired track grooves 127 of the outer joint member 122 with respect to a plane P including the joint center O at the operating angle of 0°.

In the vertical cross-section illustrated in FIG. 20(a), the track grooves 127 formed in a spherical inner peripheral surface 126 of the outer joint member 122 each extend in a circular-arc shape along the axial direction, and have a curvature center located at the joint center O. In a spherical outer peripheral surface 128 of the inner joint member 123, the track grooves 129 that face the track grooves 127 of the outer joint member 122 each extend in a circular-arc shape along the axial direction, and have a curvature center located at the joint center O. Eight balls 124 for transmitting torque are interposed in intersecting portions between the track grooves 127 of the outer joint member 122 and the track grooves 129 of the inner joint member 123. The cage 125 for holding the balls 124 is arranged between the spherical inner peripheral surface 126 of the outer joint member 122 and the spherical outer peripheral surface 128 of the inner joint member 123. The cage 125 has a spherical outer peripheral surface 132 fitted to the spherical inner peripheral surface 126 of the outer joint member 122, and a spherical inner peripheral surface 133 fitted to the spherical outer peripheral surface 128 of the inner joint member 123. The spherical outer peripheral surface 132 and the spherical inner peripheral surface 133 each have a curvature center formed at the joint center O. In the constant velocity universal joint 121, the curvature center of each of the ball-raceway center lines x and y of the respective track grooves 127 and 129 of the outer joint member 122 and the inner joint member 123 is not offset in the axial direction with respect to the joint center O. However, the track grooves 127 and 129 that are inclined and face each other intersect with each other, and the balls 124 are interposed in those intersecting portions. With this, when the joint forms an operating angle, the balls 124 are always guided in a plane obtained by bisection of an angle formed between axial lines of the outer joint member 122 and the inner joint member 123. As a result, rotational torque is transmitted at a constant velocity between the two axes.

In the fixed type constant velocity universal joint 121 of the track groove crossing type described above, the track grooves 127 and 129 of the outer joint member 122 and the inner joint member 123 that are adjacent to each other in the circumferential direction are inclined in the directions opposite to each other. Thus, forces in the opposite directions are applied from the balls 124 to pocket portions 125a adjacent to each other in the circumferential direction of the cage 125. Due to the forces in the opposite directions, the cage 125 is stabilized at a position of the joint center O. Therefore, a contact force between the spherical outer peripheral surface 132 of the cage 125 and the spherical inner peripheral surface 126 of the outer joint member 122, and a contact force between the spherical inner peripheral surface 133 of the cage 125 and the spherical outer peripheral surface 128 of the inner joint member 123 are suppressed. Thus, the joint is smoothly operated under high load and in high speed rotation, and torque loss and heat generation are suppressed. As a result, higher durability can be achieved.

The fixed type constant velocity universal joint 121 is excellent as a joint that suppresses heat generation. However, there is a problem as follows. As illustrated in FIG. 20(b), when a large inlet chamfer 130 is formed in the outer joint member 122 in a structure in which the curvature center of the track groove 127 matches with the joint center O, the effective track length of the track groove 127 of the outer joint member 122 is insufficient. Thus, when a high operating angle θ is formed, the ball 124 drops off the track groove 127, with the result that higher operating angles may not be formed.

PRIOR ART DOCUMENTS

Patent Documents

Patent Document 1: JP 2009-250365 A

SUMMARY OF THE INVENTION

Problems to be Solved by the Invention

In view of the above-mentioned problem with the conventional technology, the inventors of the present invention have studied a configuration in which, in each of the track grooves, a part on the opening side with respect to the joint center O is formed into a straight shape so that a higher operating angle can be formed in the fixed type constant velocity universal joint of the track groove crossing type disclosed in Patent Document 1. This constant velocity universal joint is illustrated in FIGS. 17(a) and 17(b). FIG. 17(a) is a vertical sectional view, and FIG. 17(b) is a right side view of FIG. 17(a). As illustrated in FIG. 17(a), this constant velocity universal joint 141 includes an outer joint member 142 and an inner joint member 143 respectively including track grooves 147 and 149 of a crossing type. The track grooves 147 of the outer joint member 142 each include a track groove 147a corresponding to the depth side with respect to the joint center O and having a circular-arc ball-raceway center line xa about the joint center O as a curvature center, and a track groove 147b corresponding to the opening side with respect to the joint center O and having a straight ball-raceway center line xb. On the other hand, the track grooves 149 of the inner joint member 143 each include a track groove 149b corresponding to the depth side with respect to the joint center O and having a straight ball-raceway center line yb, and a track groove 149a corresponding to the opening side with respect to the joint center O and having a circular-arc ball-raceway center line ya about the joint center O as a curvature center.

Further, as illustrated in FIG. 17(b), the track grooves 147 and 149 respectively include track grooves 147A and 147B and track grooves 149A and 149B that are inclined in the circumferential direction with respect to the joint axial line and respectively adjacent to each other in the circumferential direction with their inclination directions opposite to each other. In addition, balls 144 are arranged in intersecting portions of pairs of the track grooves 147A and 149A and pairs of the track grooves 147B and 149B of the outer joint member 142 and the inner joint member 143. Thus, at the operating angle of 0° as in the example of the figure, at the time of torque transmission, a wedge angle formed between the track grooves 147A and 149A and a wedge angle formed between the track grooves 147B and 149B are opened in directions opposite to each other. Thus, forces in the opposite directions are applied from the balls 144 to pocket portions 145a adjacent to each other in the circumferential direction of a cage 145. Due to the forces in the opposite directions, the cage 145 is stabilized at the position of the joint center O. Therefore, a contact force between a spherical outer peripheral surface 152 of the cage 145 and a spherical inner peripheral surface 146 of the outer joint member 142, and a contact force between a spherical inner peripheral surface 153 of the cage 145 and a spherical outer peripheral surface 148 of the inner joint member 143 are suppressed. Thus, the joint is smoothly operated under high load and in high speed rotation, and torque loss and heat generation are suppressed. As a result, higher durability can be achieved.

As described above, in the track groove crossing type, when the straight track groove 147b is formed on the opening side with respect to the joint center O in each of the track grooves 147 of the outer joint member 142, the effective track length can be increased. However, it has been found that there is a problem in terms of suppression of torque loss and heat generation of the joint at the time of forming frequently used operating angles. Description is made of a cause of the problem with reference to FIG. 18. The track grooves 147 and 149, and the balls 144 are normally held in contact with each other at a contact angle (approximately from 30° to 45°). Thus, as illustrated in FIG. 18, the track grooves 147 and 149, and the balls 144 are held in contact with each other at positions indicated by broken lines on side surface sides of the track grooves 147 and 149, which are slightly spaced apart from groove bottoms of the track grooves 147 and 149. When the joint forms an operating angle, both wedge angle components (not shown) due to intersection between the track grooves 147 and 149 and wedge angle components α due to expansion between the groove bottoms of the track grooves 147 and 149 in a radial direction of the joint are applied to the balls 144. Of those, forces of the wedge angle components due to the intersection between the track grooves 147 and 149 are counterbalanced with each other. This is because the track grooves 147 and 149 are inclined alternately in the directions opposite to each other, and hence the forces in the opposite directions are applied from the balls 144 to the pocket portions 145a of the cage 145.

However, as illustrated in FIG. 18, for the wedge angle components α due to the expansion between the groove bottoms of the track grooves 147 and 149 in the radial direction of the joint, balls 144 within phase ranges of from 0° to 90° and 270° to 360° in FIG. 17(b) are located in the straight track grooves 147b and 149b. Due to a wedge angle component α1 opened to the opening side, a force toward the opening side is applied to each of the balls 144 within those phase ranges. On the other hand, balls 144 within a phase range of from 90° to 270° are located in the circular-arc track grooves 147a and 149a. Thus, a wedge angle component α2, which is generated due to the expansion in the radial direction of the joint, is zero in any of the balls within this phase range, and hence a push-out force is not generated in the balls 144. Therefore, when the wedge angle components due to the intersection between the track grooves 147 and 149 and the wedge angle components α due to the expansion between the groove bottoms of the track grooves 147 and 149 in the radial direction of the joint are applied simultaneously with each other with respect to the balls 144, the forces applied from the balls 144 to the pocket portions 145a of the cage 145 cannot be balanced with each other. As a result, there arises a problem in that the contact forces between the spherical contact portions 152 and 146 of the cage 145 and the outer joint member 142, and between the spherical contact portions 153 and 148 of the cage 145 and the inner joint member 143 cannot be suppressed. In particular, it has been found that this problem is serious in terms of suppression of torque loss and heat generation in a range of the frequently used operating angles including a normal angle.

In view of the problem described above, it is an object of the present invention to provide a compact fixed type constant velocity universal joint that suppresses torque loss and heat generation, has high efficiency, and is capable of forming high operating angles and also excellent in strength and durability at the high operating angles.

Solutions to the Problems

Through various studies for achieving the above-mentioned object, the inventors of the present invention have conceived the following novel idea. In order to suppress torque loss and heat generation and to achieve higher efficiency, track grooves are intersected with each other in a circumferential direction, first track groove portions each comprising a circular-arc ball-raceway center line having a curvature center that is not offset in an axial direction with respect to a joint center are provided so as to be adaptable to a range of frequently used operating angles, and second track groove portions each comprising a ball-raceway center line formed into a shape different from a shape of the ball-raceway center line of each of the first track groove portions are provided so as to be adaptable to a range of less frequently used high operating angles.

As technical means for achieving the above-mentioned object, according to one embodiment of the present invention, there is provided a fixed type constant velocity universal joint, comprising: an outer joint member having: a spherical inner peripheral surface provided with a plurality of track grooves extending in an axial direction; and an opening side and a depth side spaced apart from each other in the axial direction; an inner joint member having a spherical outer peripheral surface provided with a plurality of track grooves that are paired with the plurality of track grooves of the outer joint member; a plurality of balls for transmitting torque, the plurality of balls being interposed between the plurality of track grooves of the outer joint member and the plurality of track grooves of the inner joint member; and a cage for holding the plurality of balls, the cage having a spherical outer peripheral surface and a spherical inner peripheral surface that are fitted respectively to the spherical inner peripheral surface of the outer joint member and the spherical outer peripheral surface of the inner joint member. The plurality of track grooves of the outer joint member comprise: first track groove portions 7a each located on the depth side; and second track groove portions 7b each located on the opening side. The first track groove portions 7a each comprise a circular-arc part having a curvature center that is prevented from being offset in the axial direction with respect to a joint center O, The first track groove portions 7a are inclined in a circumferential direction with respect to a joint axial line N-N, and are adjacent to each other in the circumferential direction with their inclination directions opposite to each other. The second track groove portions 7b are each formed into a shape different from a shape of each of the first track groove portions 7a so as to increase an effective track length with respect to a maximum operating angle. The first track groove portions 7a and the second track groove portions 7b are connected respectively to each other on the opening side with respect to the joint center O. Each of the plurality of track grooves of the inner joint member is formed to be mirror-image symmetrical with corresponding one of the plurality of paired track grooves of the outer joint member with respect to a plane P comprising the joint center O at an operating angle of 0°. The above-mentioned "joint axial line" herein refers to a longitudinal axial line as a joint rotation center, and corresponds to a joint axial line N-N in embodiments described later. The same applies to a joint axial line described in the claims.

Specifically, the circular-arc part of the each of the first track groove portions 7a comprises a circular-arc ball-raceway center line Xa having a curvature center that is prevented from being offset in the axial direction with respect to the joint center O. A plane M comprising at least the circular-arc ball-raceway center line Xa and the joint center O is inclined with respect to the joint axial line N-N. The second track groove portions 7b each comprise a ball-raceway center line Xb formed into a shape different from a shape of the circular-arc ball-raceway center line Xa of the each of the first track groove portions 7a. The circular-arc ball-raceway center line Xa of the each of the first track groove portions 7a comprises an end portion A located on the opening side with respect to the joint center O. The ball-raceway center line Xb of each of the second track groove portions 7b is connected to the end portion A. The plurality of track grooves of the inner joint member each have a ball-raceway center line Y formed to be mirror-image symmetrical with a ball-raceway center line X of corresponding one of the plurality of paired track grooves of the outer joint member with respect to the plane P comprising the joint center O at the operating angle of 0°.

With the structure described above, it is possible to provide a compact fixed type constant velocity universal joint that suppresses torque loss and heat generation, has high efficiency, and is capable of forming high operating angles and also excellent in strength and durability at the high operating angles.

More specifically, an angle $\beta$ is formed by a straight line L connecting the joint center O and a point at which one of the first track groove portions 7a and corresponding one of the second track groove portions 7b are connected to each other, that is, the end portion A on the opening side of the ball-raceway center line Xa, with respect to the plane P comprising the joint center O at the operating angle of 0°, and the angle $\beta$ may be appropriately set in accordance with a usage state. When the angle $\beta$ is set to range from 3° to 10° in consideration of a range of normal operating angles of automotive constant velocity universal joints, the fixed type constant velocity universal joint of the present invention is widely applicable to various vehicle types. Note that, here, the angle $\beta$ is defined as a minimum angle that is formed by the straight line L and a straight line in the plane P. In addition, the same applies to the embodiments and the claims.

The curvature center of the circular-arc ball-raceway center line Xa of the each of the first track groove portions 7a is arranged on the joint axial line N-N. With this, track groove depths can be equalized. Further, the curvature center of the circular-arc ball-raceway center line Xa of the each of the first track groove portions 7a is offset in a radial direction with respect to the joint axial line N-N. With this, the track groove depths can be adjusted on the joint depth side, and hence optimum track groove depths can be secured.

The spherical outer peripheral surface and the spherical inner peripheral surface of the cage each have a curvature center that is offset in the axial direction with respect to the joint center O. With this, the cage can be increased in thickness toward the opening side, and hence the strength of the cage can be secured particularly at high operating angles.

The ball-raceway center line Xb of the each of the second track groove portions 7b comprises a circular-arc part. Further, the ball-raceway center line Xb of the each of the second track groove portions 7b comprises the circular-arc part and a straight part. A part of the ball-raceway center line Xb that corresponds to the straight part is connected smoothly to the end portion A on the opening side of the circular-arc ball-raceway center line Xa of corresponding one of the first track groove portions 7a. With this, the effective track length can be increased, and hence a higher maximum operating angle can be formed.

Further, the circular-arc part of the ball-raceway center line Xb of the each of the second track groove portions 7b has a curvature center located on an outside in the radial direction with respect to the circular-arc ball-raceway center line Xa of the corresponding one of the first track groove portions 7a and offset to the opening side with respect to the joint center O. With this, the fixed type constant velocity universal joint of the present invention can be made compact. In addition, the effective track length can be increased, and hence a higher maximum operating angle can be formed.

When the curvature center of the circular-arc part of the ball-raceway center line Xb of the each of the second track groove portions 7b is formed at a position out of the plane M comprising the circular-arc ball-raceway center line Xa of the corresponding one of the first track groove portions 7a and the joint center O, an inclination angle of the ball-raceway center line Xb on the opening side can become gradually lower. With this, intervals on a closer side between the second track groove portions 7b adjacent to each other in the circumferential direction are increased, and hence differences in intervals can be reduced in the circumferential direction. As a result, differences in contact area on the opening side between the spherical inner peripheral surfaces of the outer joint member and differences in contact area on the depth side between the spherical outer peripheral surfaces of the inner joint member can be reduced. Thus, spherical contact portions between the cage and each of the outer joint member and the inner joint member can be arranged in a balanced manner. As a result, the fixed type constant velocity universal joint of the present invention can be more smoothly operated.

When the number of the plurality of balls for transmitting torque is set to eight or ten, it is possible to provide a fixed type constant velocity universal joint, and by extension, to provide an automotive drive shaft that is lightweight and compact, has high efficiency, and is capable of forming high operating angles.

Effects of the Invention

According to one embodiment of the present invention, it is possible to provide the compact fixed type constant velocity universal joint that suppresses torque loss and heat generation, has high efficiency, and is capable of forming high operating angles and also excellent in strength and durability at the high operating angles.

BRIEF DESCRIPTION OF DRAWINGS

FIG. 1a is a partial vertical sectional view of a fixed type constant velocity universal joint according to a first embodiment of the present invention.

FIG. 1b is a side view of the fixed type constant velocity universal joint according to the first embodiment of the present invention.

FIG. 2a is a partial vertical sectional view of an outer joint member of the fixed type constant velocity universal joint.

FIG. 2b is a side view of the outer joint member of the fixed type constant velocity universal joint.

EMBODIMENTS OF THE INVENTION

Figure 3A:
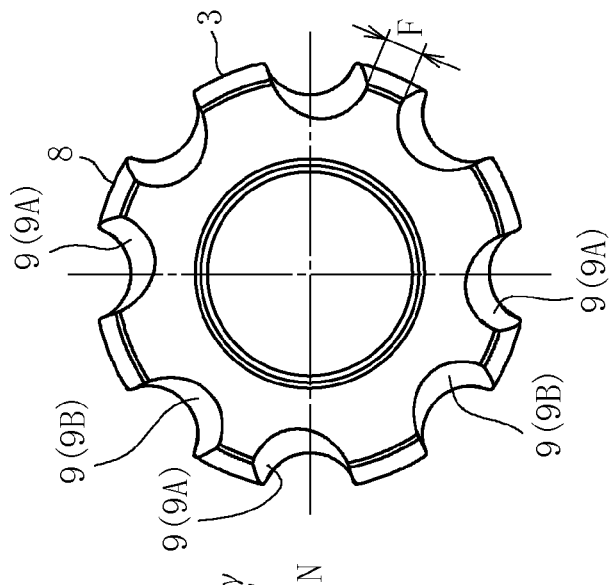
FIG. 3a is a left side view of an inner joint member of the fixed type constant velocity universal joint.

Description is made of embodiments of the present invention with reference to FIGS. 1 to 16.

FIGS. 1 to 8 illustrate a first embodiment of the present invention. FIGS. 1a and 1b illustrate a fixed type constant velocity universal joint according to the first embodiment. FIG. 1a is a partial vertical sectional view, and FIG. 1b is a right side view of FIG. 1a. A constant velocity universal joint 1 of this embodiment comprises, as main components, an outer joint member 2, an inner joint member 3, balls 4, and a cage 5. As illustrated in FIG. 1b, FIGS. 2a and 2b, and FIGS. 3a-3c, eight track grooves 7 and 9 of the outer joint member 2 and the inner joint member 3 respectively comprise track grooves 7A and 7B and track grooves 9A and 9B that are inclined in a circumferential direction with respect to a joint axial line N-N and respectively adjacent to each other in the circumferential direction with their inclination directions opposite to each other. Further, the eight balls 4 are arranged in intersecting portions of pairs of the track grooves 7A and 9A and pairs of track grooves 7B and 9B of the outer joint member 2 and the inner joint member 3. FIG. 1a illustrates the track grooves 7 and 9 under a state in which the cross-sections are rotated to an inclination angle γ=0° in a plane M illustrated in FIG. 2a and a plane Q illustrated in FIG. 3b. The details thereof are described later.

FIG. 1a illustrates the joint in vertical cross-section. The term "ball-raceway center line" is used herein to accurately describe forms such as an inclined state and a curved state, and shapes of the track grooves extending in an axial direction. Specifically, the ball-raceway center line refers to a trajectory of a center of each of the balls that are arranged in the track grooves and moved along the track grooves. Thus, inclined states of the track grooves correspond to inclined states of the ball-raceway center lines, and circular-arc shapes or straight shapes of the track grooves correspond to circular-arc shapes or straight shapes of the ball-raceway center lines.

As illustrated in FIG. 1a, the track grooves 7 of the outer joint member 2 each have a ball-raceway center line X. The track grooves 7 each comprise a first track groove portion 7a having a circular-arc ball-raceway center line Xa about a joint center O as a curvature center, and a second track groove portion 7b having a circular-arc ball-raceway center line Xb curved in a direction opposite to that of the first track groove portion 7a. The ball-raceway center line Xb of the second track groove portion 7b is connected smoothly to the ball-raceway center line Xa of the first track groove portion 7a. On the other hand, the track grooves 9 of the inner joint member 3 each have a ball-raceway center line Y. The track grooves 9 each comprise a first track groove portion 9a having a circular-arc ball-raceway center line Ya about the joint center O as a curvature center, and a second track groove portion 9b having a circular-arc ball-raceway center line Yb curved in a direction opposite to that of the first track groove portion 9a. The ball-raceway center line Yb of the second track groove portion 9b is connected smoothly to the ball-raceway center line Ya of the first track groove portion 9a. In this way, the ball-raceway center lines Xa and Ya of the first track groove portions 7a and 9a and the ball-raceway center lines Xb and Yb of the second track groove portions 7b and 9b are different in shape from each other. The curvature centers of the ball-raceway center lines Xa and Ya of the first track groove portions 7a and 9a are arranged on the joint center O, in other words, on the joint axial line N-N. With this, track groove depths can be equalized, and processes can be facilitated. Although not shown, the track grooves 7 and 9 are each formed into an elliptical shape or a Gothic arch shape in horizontal cross-section, and the track grooves 7 and 9 are held in what is called angular contact with the balls 4 at a contact angle (approximately from 30° to 45°). Thus, the balls 4 are held in contact with side surface sides of the track grooves 7 and 9, which are slightly spaced apart from groove bottoms of the track grooves 7 and 9.

With reference to FIGS. 2a and 2b, detailed description is made of a state in which the track grooves 7 of the outer joint member 2 are inclined in the circumferential direction with respect to the joint axial line N-N. FIG. 2a is a partial vertical sectional view of the outer joint member 2, and FIG. 2b is a right side view of the outer joint member 2. The reference symbols of the track grooves 7A and 7B of the track grooves 7 of the outer joint member 2 are given based on the difference in inclination direction. As illustrated in FIG. 2a, the plane M comprising the ball-raceway center line X of the track groove 7A and the joint center O is inclined at an angle γ with respect to the joint axial line N-N. On the other hand, for the track groove 7B adjacent in the circumferential direction to the track groove 7A, although not shown, another plane M comprising the ball-raceway center line X of the track groove 7B and the joint center O is inclined at the angle γ in a direction opposite to the inclination direction of the track groove 7A with respect to the joint axial line N-N. In this embodiment, the entire ball-raceway center line X of the track groove 7A, in other words, both the ball-raceway center line Xa of the first track groove portion 7a and the ball-raceway center line Xb of the second track groove portion 7b are formed in the plane M. However, the present invention is not limited thereto, and may be carried out in an embodiment in which the plane M comprises only the ball-raceway center line Xa of the first track groove portion 7a. Thus, it suffices that the plane M comprising at least the ball-raceway center line Xa of the first track groove portion 7a and the joint center O be inclined with respect to the joint axial line N-N, and that the inclination directions of the first track groove portions 7a adjacent to each other in the circumferential direction be opposite to each other.

Here, supplementary description is made of the reference symbols of the track grooves. Reference symbol 7 represents the track grooves of the outer joint member 2 as a whole, reference symbol 7a represents the first track groove portion, and reference symbol 7b represents the second track groove portion. Further, reference symbols 7A and 7B represent the track grooves distinguished from each other based on a difference in inclination direction, reference symbols 7Aa and 7Ba represent first track groove portions of the respective track grooves 7A and 7B, and reference symbols 7Ab and 7Bb represent second track groove portions of the respective track grooves 7A and 7B. The track grooves of the inner joint member 3 described below are similarly represented by the reference symbols.

Figure 3B:
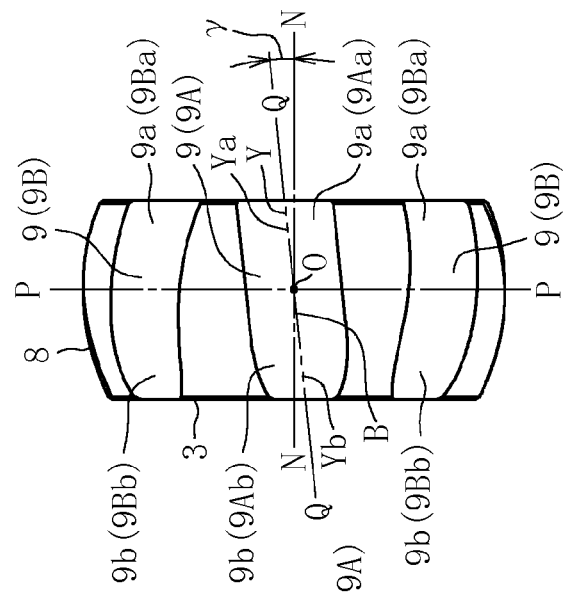
FIG. 3b is a view of an outer peripheral surface of the inner joint member of the fixed type constant velocity universal joint.
Figure 3C:
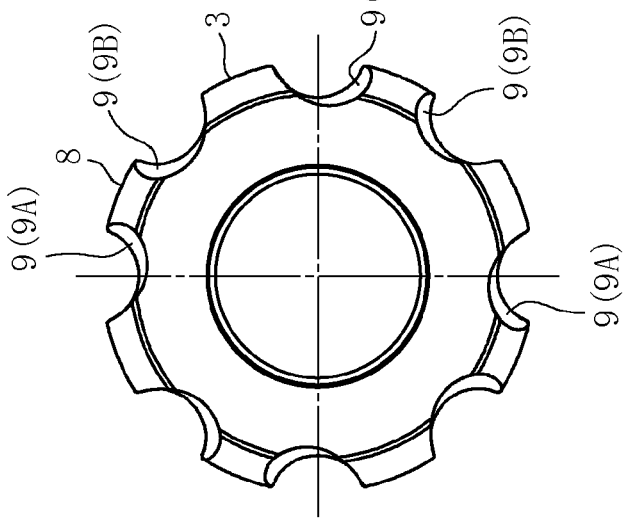
FIG. 3c is a right side view of the inner joint member of the fixed type constant velocity universal joint.

Next, with reference to FIGS. 3a-3c, detailed description is made of a state in which the track grooves 9 of the inner joint member 3 are inclined in the circumferential direction with respect to the joint axial line N-N. FIG. 3b illustrates an outer peripheral surface of the inner joint member 3, FIG. 3a illustrates a left side surface of the inner joint member 3, and FIG. 3c illustrates a right side surface thereof. The reference symbols of the track grooves 9A and 9B of the track grooves 9 of the inner joint member 3 are given based on the difference in inclination direction. As illustrated in FIG. 3b, the plane Q comprising the ball-raceway center line Y of the track groove 9A and the joint center O is inclined at the angle γ with respect to the joint axial line N-N. On the other hand, for the track groove 9B adjacent in the circumferential direction to the track groove 9A, although not shown, another plane Q comprising the ball-raceway center line Y of the track groove 9B and the joint center O is inclined at the angle γ in a direction opposite to the inclination direction of the track groove 9A with respect to the joint axial line N-N. The inclination angle γ is preferably set to range from 4° to 12° in consideration of operability of the constant velocity universal joint 1 and spherical widths F between closest sides of the track grooves of the inner joint member 3. Similarly to the outer joint member described above, in this embodiment, the entire ball-raceway center line Y of the track groove 9A, in other words, both the ball-raceway center line Ya of the first track groove portion 9a and the ball-raceway center line Yb of the second track groove portion 9b are formed in the plane Q. However, the present invention is not limited thereto, and may be carried out in an embodiment in which the plane Q comprises only the ball-raceway center line Ya of the first track groove portion 9a. Thus, it suffices that the plane Q comprising at least the ball-raceway center line Ya of the first track groove portion 9a and the joint center O be inclined in the circumferential direction with respect to the joint axial line N-N, and that the inclination directions of the first track groove portions 9a adjacent to each other in the circumferential direction be opposite to each other. The ball-raceway center line Y of the track groove 9 of the inner joint member 3 is formed to be mirror-image symmetrical with the ball-raceway center line X of the paired track groove 7 of the outer joint member 2 with respect to a plane P comprising the joint center O and being perpendicular to the joint axial line N-N at an operating angle of 0°.

Figure 4:
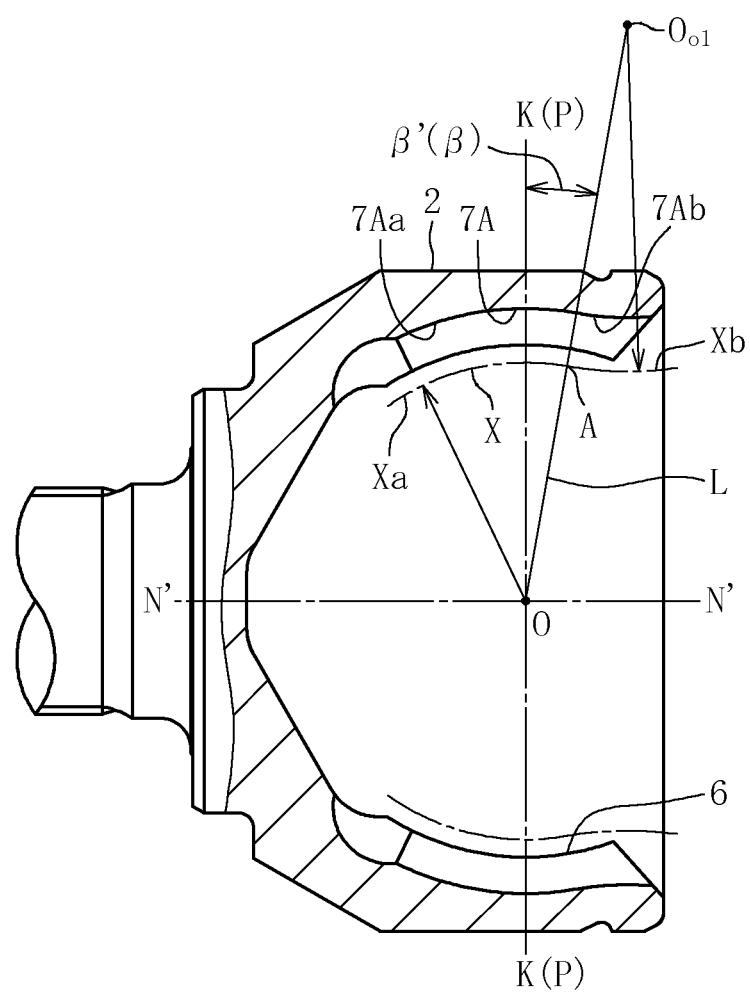
FIG. 4 is a partial vertical sectional view of details of a track groove of the outer joint member.

With reference to FIG. 4, detailed description is made of the track grooves as viewed in vertical cross-section of the outer joint member 2. The partial vertical cross-section of FIG. 4 corresponds to a sectional view as viewed in the plane M of FIG. 2a, which comprises the ball-raceway center line X of the track groove 7A and the joint center O. Thus, strictly, FIG. 4 is not a vertical sectional view in the plane comprising the joint axial line N-N, but illustrates a cross-section inclined at the angle γ. FIG. 4 illustrates the track groove 7A of the outer joint member 2. Description of the track groove 7B is omitted because the track groove 7B is inclined in the direction opposite to that of the track groove 7A, and other structural details thereof are the same as those of the track groove 7A. The outer joint member 2 has a spherical inner peripheral surface 6 comprising the track grooves 7A formed along the axial direction. The track grooves 7A each have the ball-raceway center line X, and the track grooves 7A each comprise the first track groove portion 7Aa having the circular-arc ball-raceway center line Xa about the joint center O as a curvature center (not offset in the axial direction), and the second track groove portion 7Ab having the circular-arc ball-raceway center line Xb about a point $O_{o1}$ as a curvature center, which is located on an outside in a radial direction with respect to the ball-raceway center line Xa of the first track groove portion 7Aa and offset from the joint center O to an opening side in the axial direction. Thus, the circular-arc ball-raceway center line Xb of the second track groove portion 7Ab is curved in a direction opposite to that of the circular-arc ball-raceway center line Xa of the first track groove portion 7Aa. At a point corresponding to an end portion A on the opening side of the ball-raceway center line Xa of the first track groove portion 7Aa, a straight line connecting the joint center O and the offset point $O_{o1}$ to each other intersects with the ball-raceway center line X, and the end portion A and the joint center O are connected to each other with a straight line L. The ball-raceway center line Xb of the second track groove portion 7Ab is connected smoothly to the end portion A. In other words, the end portion A is a connecting point between the first track groove portion 7Aa and the second track groove portion 7Ab. An angle β' formed between a perpendicular line K and the straight line L with respect to the joint center O on a joint axial line N'-N' projected in the plane M comprising the ball-raceway center line X of the track groove 7A and the joint center O (refer to FIG. 2a) is inclined at the angle γ with respect to the joint axial line N-N. The perpendicular line K is in the plane P comprising the joint center O at the operating angle of 0°. Thus, an angle β formed by the straight line L with respect to the plane P comprising the joint center O at the operating angle of 0° has a relationship of $\sin \beta = \sin \beta' \times \cos \gamma$ in the present invention. Alternatively, β corresponds to a projection of β' in a plane corresponding to the plane M inclined at γ with respect to the perpendicular line K and comprising the joint axial line N-N, in other words, in the plane M at the inclination angle γ=0°, and hence may be expressed by $\tan \beta = \tan \beta' \times \cos \gamma$. There is substantially no difference between the former and the latter in terms of a practical numerical range. However, the former is employed here. As described above, the first track groove portion 7Aa and the second track groove portion 7Ab of the outer joint member 2 are each formed of a single circular arc. However, the present invention is not limited thereto, and the first track groove portion 7Aa and the second track groove portion 7Ab of the outer joint member 2 may each be formed of a plurality of circular arcs in consideration, for example, of the track groove depths.

Figure 5:
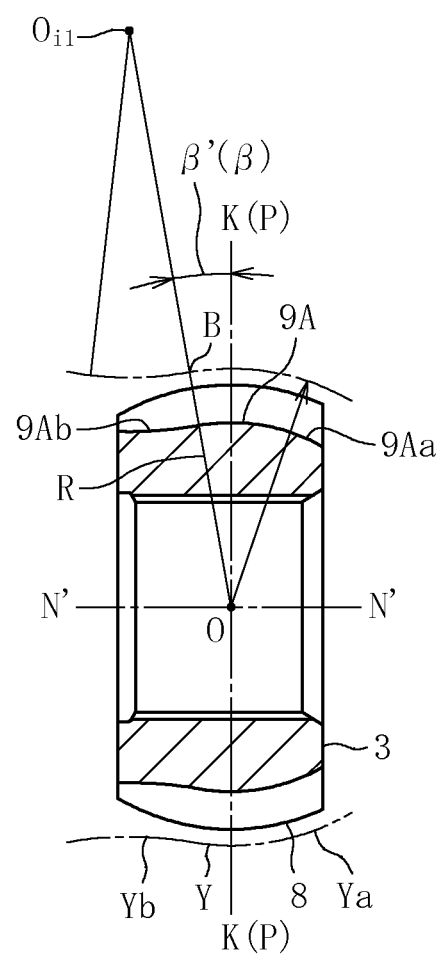
FIG. 5 is a vertical sectional view of details of a track groove of the inner joint member.

Similarly, with reference to FIG. 5, detailed description is made of the track grooves in the vertical cross-section of the inner joint member 3. The vertical cross-section of FIG. 5 corresponds to a sectional view as viewed in the plane Q of FIG. 3b, which comprises the ball-raceway center line Y of the track groove 9A and the joint center O. Thus, similarly to FIG. 4, strictly, FIG. 5 is not a vertical sectional view in the plane comprising the joint axial line N-N, but illustrates a cross-section inclined at the angle γ. FIG. 5 illustrates the track groove 9A of the inner joint member 3. Description of the track groove 9B is omitted because the track groove 9B is inclined in the direction opposite to that of the track groove 9A, and other structural details thereof are the same as those of the track groove 9A. The inner joint member 3 has a spherical outer peripheral surface 8 comprising the track grooves 9A formed along the axial direction. The track grooves 9A each have the ball-raceway center line Y, and the track grooves 9A each comprise the first track groove portion 9Aa having the circular-arc ball-raceway center line Ya about the joint center O as a curvature center (not offset in the axial direction), and the second track groove portion 9Ab having the circular-arc ball-raceway center line Yb about a point $O_{i1}$ as a curvature center, which is located on an outside in a radial direction with respect to the ball-raceway center line Ya of the first track groove portion 9Aa and offset from the joint center O to a depth side in the axial direction. At a point corresponding to an end portion B on the depth side of the circular-arc ball-raceway center line Ya of the first track groove portion 9Aa, a straight line R connecting the joint center O and the offset point $O_{i1}$ to each other intersects with the ball-raceway center line Y. The ball-raceway center line Yb of the second track groove portion 9Ab is connected smoothly to the end portion B. In other words, the end portion B is a connecting point between the first track groove portion 9Aa and the second track groove portion 9Ab. The angle β' formed between the perpendicular line K and the straight line R with respect to the joint center O on the joint axial line N'-N' projected in the plane Q comprising the ball-raceway center line Y of the track groove 9A and the joint center O (refer to FIG. 3b) is inclined at the angle γ with respect to the joint axial line N-N. The perpendicular line K is in the plane P comprising the joint center O at the operating angle of 0°. Thus, the angle β formed by the straight line R with respect to the plane P comprising the joint center O at the operating angle of 0° has the relationship of $\sin β = \sin β' \times \cos γ$. Alternatively, β corresponds to a projection of β' in a plane corresponding to the plane Q inclined at γ with respect to the perpendicular line K and comprising the joint axial line N-N, in other words, in the plane Q at the inclination angle γ=0°, and hence may be expressed by $\tan β = \tan β' \times \cos γ$. There is substantially no difference between the former and the latter in terms of a practical numerical range. However, the former is employed here. As well as the track grooves of the outer joint member 2 described above, the first track groove portion 9Aa and the second track groove portion 9Ab of the inner joint member 3 may each be formed of a plurality of circular arcs in consideration, for example, of track groove depths.

Next, description is made of the angle β formed by each of the straight lines L and R with respect to the plane P comprising the joint center O at the operating angle of 0°. At an operating angle θ, the balls 4 move at θ/2 with respect to the plane P of each of the outer joint member 2 and the inner joint member 3, which comprises the joint center O. The angle β is determined based on ½ of frequently used operating angles. Then, within a range of the frequently used operating angles, contact ranges of the track grooves with respect to the balls 4 are determined. Here, the frequently used operating angles are defined. First, a normal angle of the joint refers to an operating angle formed in a fixed type constant velocity universal joint of a front drive shaft of an automobile with one person on board when a steering of the automobile is switched to a straightforward mode on a horizontal and flat road surface. Normally, the normal angle is selected and determined within a range of from 2° to 15° in accordance with design conditions for vehicle types. Further, the frequently used operating angle does not refer to a high operating angle formed in the fixed type constant velocity universal joint of the above-mentioned automobile at the time, for example, of right turning and left turning at a traffic intersection but refers to an operating angle formed in the fixed type constant velocity universal joint of the above-mentioned automobile during, for example, continuous travel on a curved road. This is also determined in accordance with the design conditions for vehicle types. The frequently used operating angle is supposed to be 20° at maximum. Thus, the angle β formed by each of the straight lines L and R with respect to the plane P comprising the joint center O at the operating angle of 0° is set to range from 3° to 10°. Note that, the angle β is not limited to the range of from 3° to 10°, and may be appropriately set in accordance with the design conditions for vehicle types. When the angle β is set to range from 3° to 10°, the fixed type constant velocity universal joint of this embodiment is widely applicable to various vehicle types.

In FIG. 4, at the angle β, the end portion A of the ball-raceway center line Xa of the first track groove portion 7Aa corresponds to a center position of a ball that is moved to an end of the opening side along the axial direction at the frequently used operating angle. Similarly, in FIG. 5, in the inner joint member 3, the end portion B of the ball-raceway center line Ya of the first track groove portion 9Aa corresponds to a center position of a ball that is moved to an end of the depth side along the axial direction at the frequently used operating angle. With this setting, within the range of the frequently used operating angles, the balls 4 are located between the first track groove portions 7Aa and 9Aa of the outer joint member 2 and the inner joint member 3, and between the first track groove portions 7Ba and 9Ba that are inclined in the opposite directions (refer to FIGS. 2a and 2b and FIGS. 3a-3c). Thus, forces in the opposite directions are applied from the balls 4 to pocket portions 5a adjacent to each other in the circumferential direction of the cage 5, and hence the cage 5 is stabilized at a position of the joint center O (refer to FIGS. 1a and 1b). Therefore, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Thus, the joint is smoothly operated under high load and in high speed rotation, and torque loss and heat generation are suppressed. As a result, higher durability can be achieved.

Figure 6:
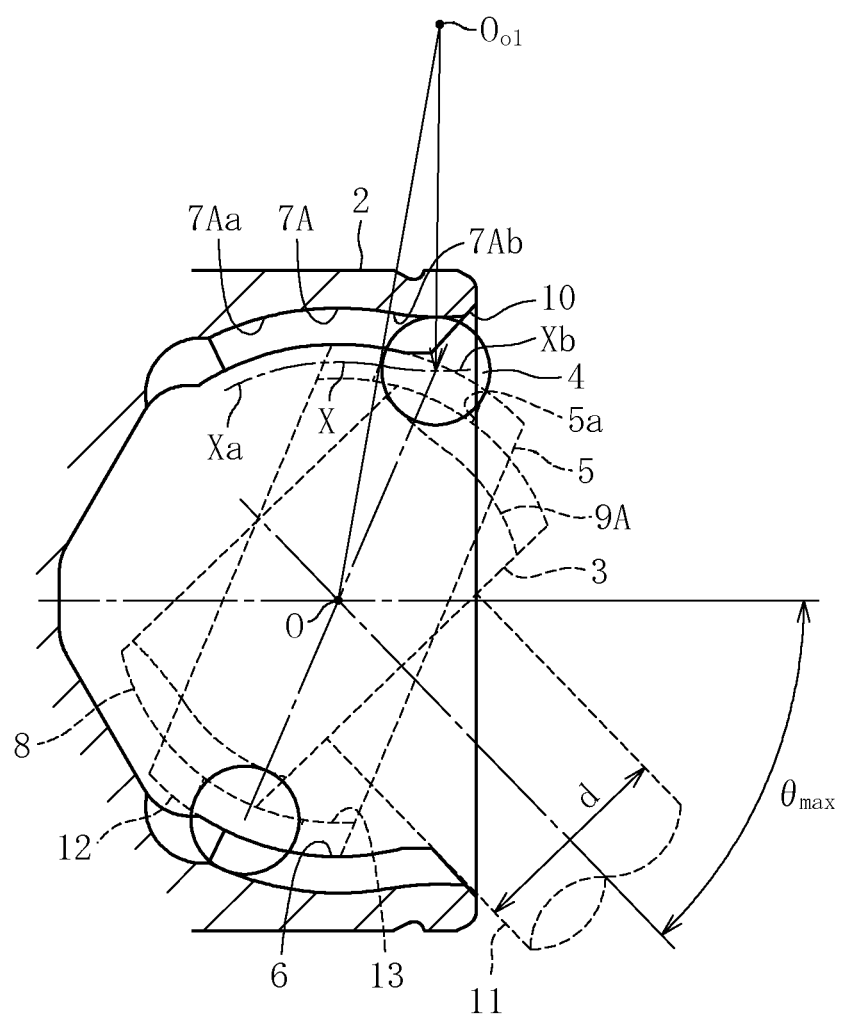
FIG. 6 is a schematic view illustrating a state in which the joint forms a maximum operating angle.

FIG. 6 illustrates a state in which the constant velocity universal joint of this embodiment forms a maximum operating angle. The track grooves 7A of the outer joint member 2 each comprise the second track groove portion 7Ab formed on the opening side and having the circular-arc ball-raceway center line Xb about the point $O_{o1}$ as a curvature center, which is located on the outside in the radial direction with respect to the ball-raceway center line Xa of the first track groove portion 7Aa and offset from the joint center O to the opening side in the axial direction. The second track groove portion 7Ab thus formed contributes to an increase in effective track length in a compact design, and hence a higher maximum operating angle can be formed. Thus, as in the example of the figure, even when a maximum operating angle $\theta_{max}$ is formed to be as high as approximately 50°, a contact state between the balls 4 and the second track groove portion 7Ab can be secured under a state in which an inlet chamfer 10 having a necessary and sufficient size is provided.

Note that, in a range of high operating angles, the balls 4 arranged in the circumferential direction are temporarily separately located between the first track groove portions 7Aa and 9Aa (7Ba and 9Ba, refer to FIGS. 2a and 3b) and between the second track groove portions 7Ab and 9Ab (7Bb and 9Bb, refer to FIGS. 2a and 3b). Thus, the forces applied from the balls 4 to the pocket portions 5a of the cage 5 are not balanced with each other, and hence the contact forces are generated respectively in the spherical contact portions 12 and 6 between the cage 5 and the outer joint member 2, and the spherical contact portions 13 and 8 between the cage 5 and the inner joint member 3. However, angles in the range of high operating angles are less frequently used, and hence the constant velocity universal joint 1 of this embodiment is comprehensively capable of suppressing torque loss and heat generation. Thus, it is possible to provide a compact fixed type constant velocity universal joint that suppresses torque loss and heat generation, has high efficiency, and is capable of forming high operating angles and also excellent in strength and durability at the high operating angles.

Figure 7A:
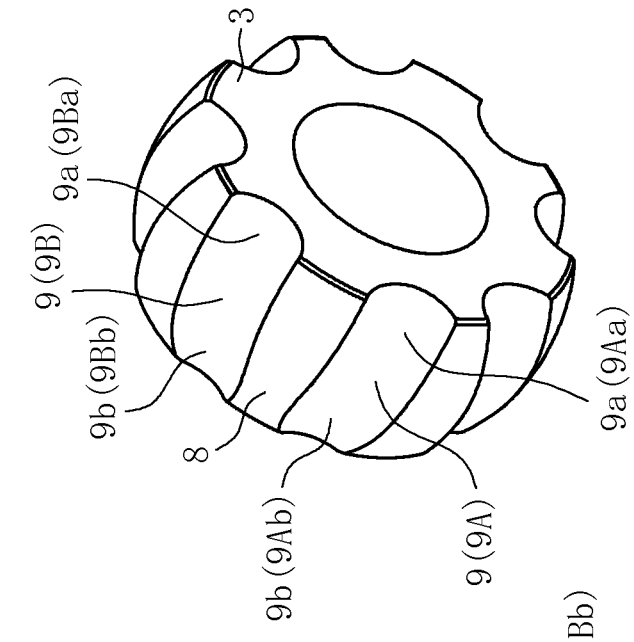
FIG. 7a is a perspective view of the outer joint member.
Figure 7B:
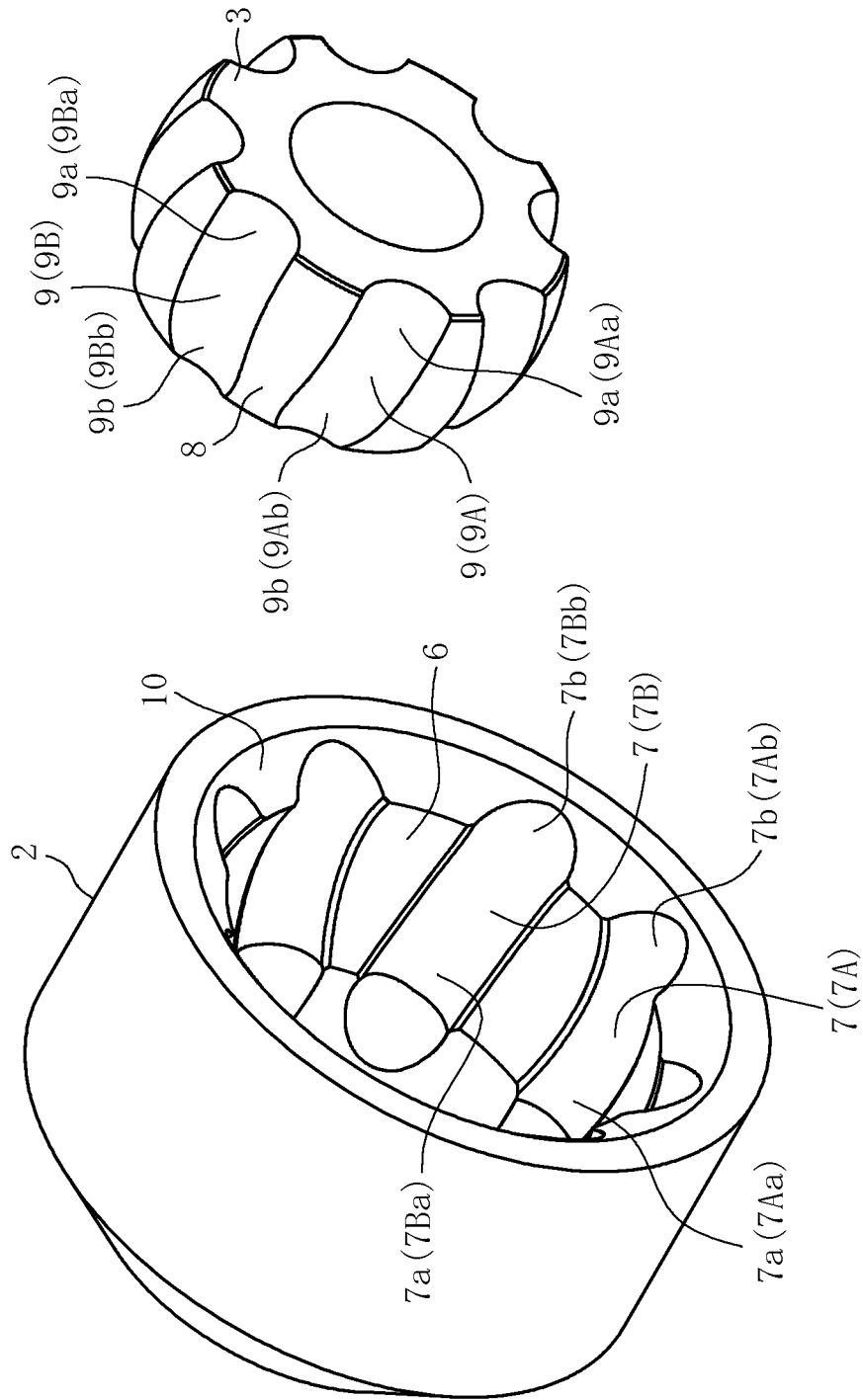
FIG. 7b is a perspective view of the inner joint member.

FIGS. 7a and 7b are perspective views of the outer joint member 2 and the inner joint member 3 of the constant velocity universal joint of this embodiment. Those perspective views three-dimensionally illustrate the track grooves described hereinabove. As illustrated in FIG. 7a, the spherical inner peripheral surface 6 of the outer joint member 2 comprises the track grooves 7A and 7B that are formed alternately to each other and inclined in the circumferential direction with respect to the joint axial line N-N (not shown) with their inclination directions alternately opposite to each other. The track grooves 7A and 7B comprise the first track groove portions 7Aa and 7Ba and the second track groove portions 7Ab and 7Bb, respectively. The outer joint member 2 has an opening rim provided with the inlet chamfer 10. Further, as illustrated in FIG. 7b, the spherical outer peripheral surface 8 of the inner joint member 3 comprises the track grooves 9A and 9B that are formed alternately to each other and inclined in the circumferential direction with respect to the joint axial line N-N (not shown) with their inclination directions alternately opposite to each other. The track grooves 9A and 9B comprise the first track groove portions 9Aa and 9Ba and the second track groove portion 9Ab and 9Bb, respectively.

Figure 8:
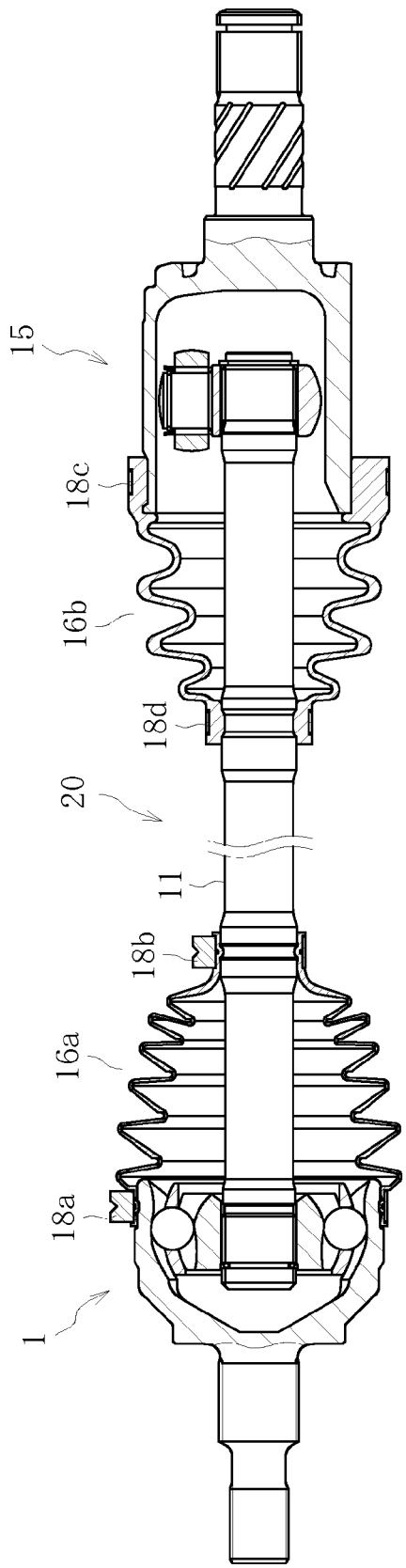
FIG. 8 is a view illustrating a state in which the fixed type constant velocity universal joint is used in an automotive drive shaft.

FIG. 8 illustrates an automotive front drive shaft 20 to which the fixed type constant velocity universal joint 1 of this embodiment is applied. The fixed type constant velocity universal joint 1 is coupled to one end of an intermediate shaft 11, and a plunging tripod type constant velocity universal joint 15 is coupled to another end thereof. At positions between an outer peripheral surface of the fixed type constant velocity universal joint 1 and an outer peripheral surface of the shaft 11 and between an outer peripheral surface of the plunging tripod type constant velocity universal joint 15 and the outer peripheral surface of the shaft 11, bellows boots 16a and 16b are respectively mounted and fixed with boot bands 18a, 18b, 18c, and 18d. Grease as a lubricant is sealed inside the joint. Through use of the fixed type constant velocity universal joint 1 of this embodiment, it is possible to provide a lightweight and compact automotive drive shaft 20 that suppresses torque loss and heat generation, has high efficiency, and forms high operating angles.

Figure 9:
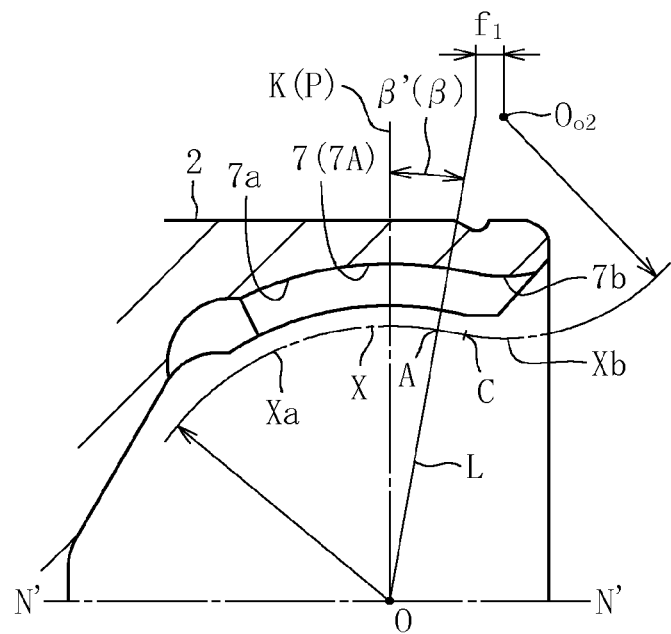
FIG. 9 is a vertical sectional view of an outer joint member of a fixed type constant velocity universal joint according to a second embodiment of the present invention.

Next, description is made of a fixed type constant velocity universal joint according to a second embodiment of the present invention with reference to FIG. 9. FIG. 9 illustrates only an outer joint member of the fixed type constant velocity universal joint of this embodiment, and is a sectional view as viewed in the plane M comprising the ball-raceway center line X of the track groove 7A and the joint center O as in FIG. 4 (refer to FIG. 2a, and the same applies to corresponding figures in the following embodiments). Further, FIG. 9 illustrates an upper half in the radial direction with respect to the axial line of the outer joint member. This fixed type constant velocity universal joint is different from the fixed type constant velocity universal joint of the first embodiment described above in that the second track groove portions each comprise a circular-arc part and a straight part, and other structural details are the same as those in the first embodiment. The parts having the same functions as those in the first embodiment are represented by the same reference symbols, and redundant description thereof is omitted.

The end portion A on the opening side of the ball-raceway center line Xa of the first track groove portion 7a of the outer joint member 2 is the same as that in the first embodiment. A curvature center $O_{o2}$ of the ball-raceway center line Xb of the second track groove portion 7b is offset by $f_1$ to the opening side from the straight line L connecting the joint center O and the end portion A to each other. Thus, the straight part of the ball-raceway center line Xb of the second track groove portion 7b is connected to the end portion A on the opening side of the ball-raceway center line Xa of the first track groove portion 7a. The straight part and the circular-arc part of the ball-raceway center line Xb of the second track groove portion 7b are connected to each other at a point C. Although not shown, the ball-raceway center line Y of the track groove 9 of the inner joint member 3 is formed to be mirror-image symmetrical with the ball-raceway center line X of the paired track groove 7 of the outer joint member 2 with respect to the plane P comprising the joint center O at the operating angle of 0°. The inclined state of the track grooves 7 and 9 of the outer joint member 2 and the inner joint member 3 in the circumferential direction with respect to the joint axial line N-N, the structure of the cage 5, and the functions of the joint are the same as those of the fixed type constant velocity universal joint of the first embodiment. Thus, redundant description thereof is omitted.

Figure 10:
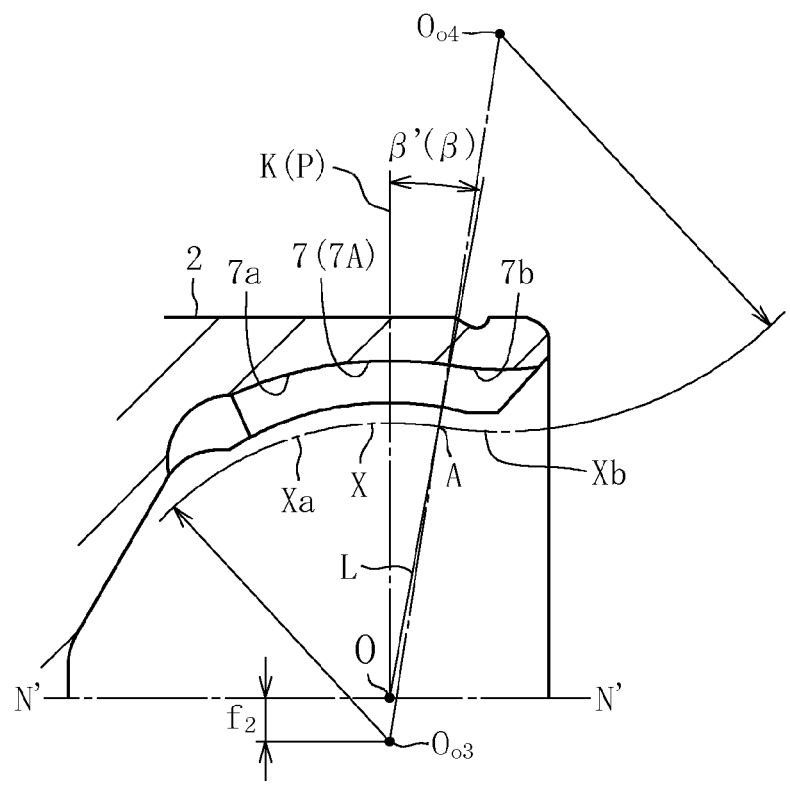
FIG. 10 is a vertical sectional view of an outer joint member of a fixed type constant velocity universal joint according to a third embodiment of the present invention.

Description is made of a fixed type constant velocity universal joint according to a third embodiment of the present invention with reference to FIG. 10. FIG. 10 also illustrates only an outer joint member of the fixed type constant velocity universal joint. This fixed type constant velocity universal joint is different from the fixed type constant velocity universal joint of the first embodiment described above in the following point. The curvature center of the circular-arc ball-raceway center line of the first track groove portion is not offset in the axial direction with respect to the joint center O, but is offset in the radial direction with respect to the joint axial line N-N. In accordance therewith, the configuration of the circular-arc ball-raceway center line of the second track groove portion is adjusted. Other structural details are the same as those in the first embodiment. Also in this embodiment, the parts having the same functions as those in the first embodiment are represented by the same reference symbols, and redundant description thereof is omitted. The same applies to the following embodiments.

The end portion A on the opening side of the ball-raceway center line Xa of the first track groove portion 7a of the outer joint member 2 is the same as that in the first embodiment. However, a curvature center $O_{o3}$ of the ball-raceway center line Xa of the first track groove portion 7a is not offset in the axial direction with respect to the joint center O, but is offset by $f_2$ in the radial direction with respect to the joint axial line. In other words, the curvature center $O_{o3}$ is offset by $f_2$ in the radial direction in the plane P comprising the joint center O at the operating angle of 0°, which includes the perpendicular line K. In accordance therewith, a position of a curvature center $O_{o4}$ of the ball-raceway center line Xb of the second track groove portion 7b is adjusted so as to connect the ball-raceway center line Xb smoothly to the ball-raceway center line Xa of the first track groove portion 7a. With this configuration, the track groove depths can be adjusted on a joint depth side. Also in the fixed type constant velocity universal joint of this embodiment, although not shown, the ball-raceway center line Y of the track groove 9 of the inner joint member 3 is formed to be mirror-image symmetrical with the ball-raceway center line X of the paired track groove 7 of the outer joint member 2 with respect to the plane P comprising the joint center O at the operating angle of 0°. The inclined state of the track grooves 7 and 9 of the outer joint member 2 and the inner joint member 3 in the circumferential direction with respect to the joint axial line N-N, the structure of the cage 5, and the functions of the joint are the same as those of the fixed type constant velocity universal joint of the first embodiment. Thus, redundant description thereof is omitted.

Figure 11A:
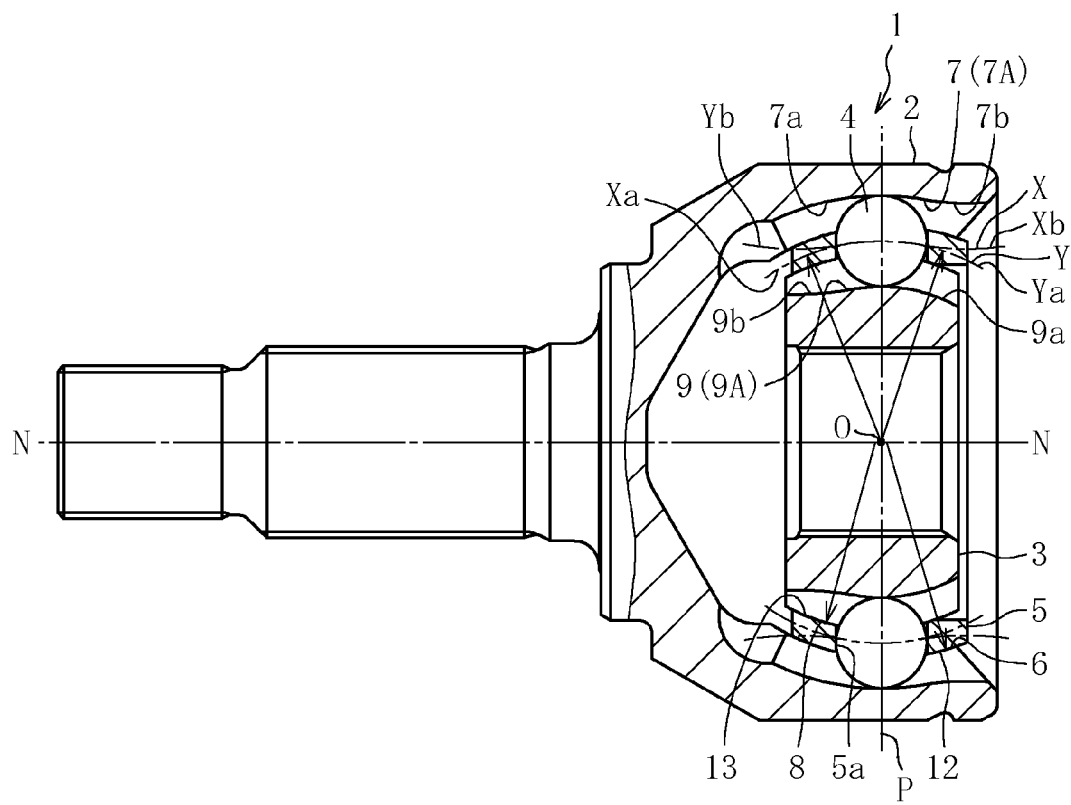
FIG. 11a is a partial vertical sectional view of a fixed type constant velocity universal joint according to a fourth embodiment of the present invention.
Figure 11B:
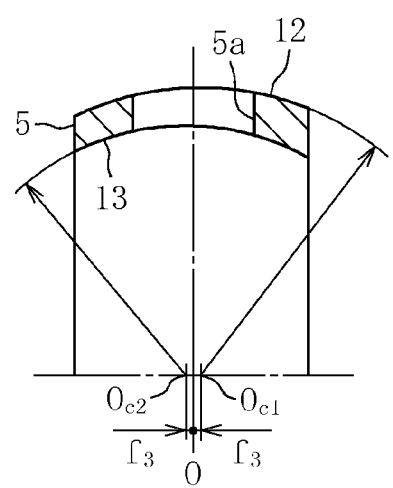
FIG. 11b is a vertical sectional view of a cage of the fixed type constant velocity universal joint.

Description is made of a fixed type constant velocity universal joint according to a fourth embodiment of the present invention with reference to FIGS. 11a and 11b. The fixed type constant velocity universal joint of this embodiment is different from the fixed type constant velocity universal joint of the first embodiment in that curvature centers of the spherical outer peripheral surface and the spherical inner peripheral surface of the cage are offset in the axial direction with respect to the joint center O, and other structural details are the same as those in the first embodiment.

FIG. 11a is a partial vertical sectional view of the fixed type constant velocity universal joint, and FIG. 11b is a vertical sectional view of the cage. FIG. 11a also illustrates the track grooves 7 and 9 under the state in which the cross-sections are rotated to the inclination angle γ=0° in the plane M illustrated in FIG. 2a and the plane Q illustrated in FIG. 3b. A curvature center $O_{c1}$ of the spherical outer peripheral surface 12 of the cage 5 and a curvature center $O_{c2}$ of the spherical inner peripheral surface 13 thereof are each offset by $f_3$ in the axial direction with respect to the joint center O. With this offset configuration, the cage 5 can be increased in thickness toward the opening side, and the cage 5 can be increased in strength particularly at high operating angles. As described above, in the range of the high operating angles, the balls 4 arranged in the circumferential direction are temporarily separately located between the first track groove portions 7Aa and 9Aa (7Ba and 9Ba, refer to FIGS. 2a and 3b) and between the second track groove portions 7Ab and 9Ab (7Bb and 9Bb, refer to FIGS. 2a and 3b). In this case, the pressing forces toward the opening side are applied from the balls 4 located between the second track groove portions 7Ab and 9Ab (7Bb and 9Bb) to the pocket portions 5a of the cage 5. However, the thickness of the cage 5 is increased toward the opening side, and hence the cage 5 can be increased in strength. Further, the track groove depths of the track grooves 7a and 9b on the depth side can be increased. Also in this embodiment, the inclined state of the track grooves 7 and 9 of the outer joint member 2 and the inner joint member 3 in the circumferential direction with respect to the joint axial line N-N, the structure of the cage 5, and the functions of the joint are the same as those of the fixed type constant velocity universal joint of the first embodiment. Thus, redundant description thereof is omitted.

Description is made of a fixed type constant velocity universal joint according to a fifth embodiment of the present invention with reference to FIG. 12 to FIG. 16. The fixed type constant velocity universal joint of this embodiment is different from the fixed type constant velocity universal joint of the first embodiment in the structure of the second track groove portion, and other structural details are the same as those in the first embodiment.

Figure 12:
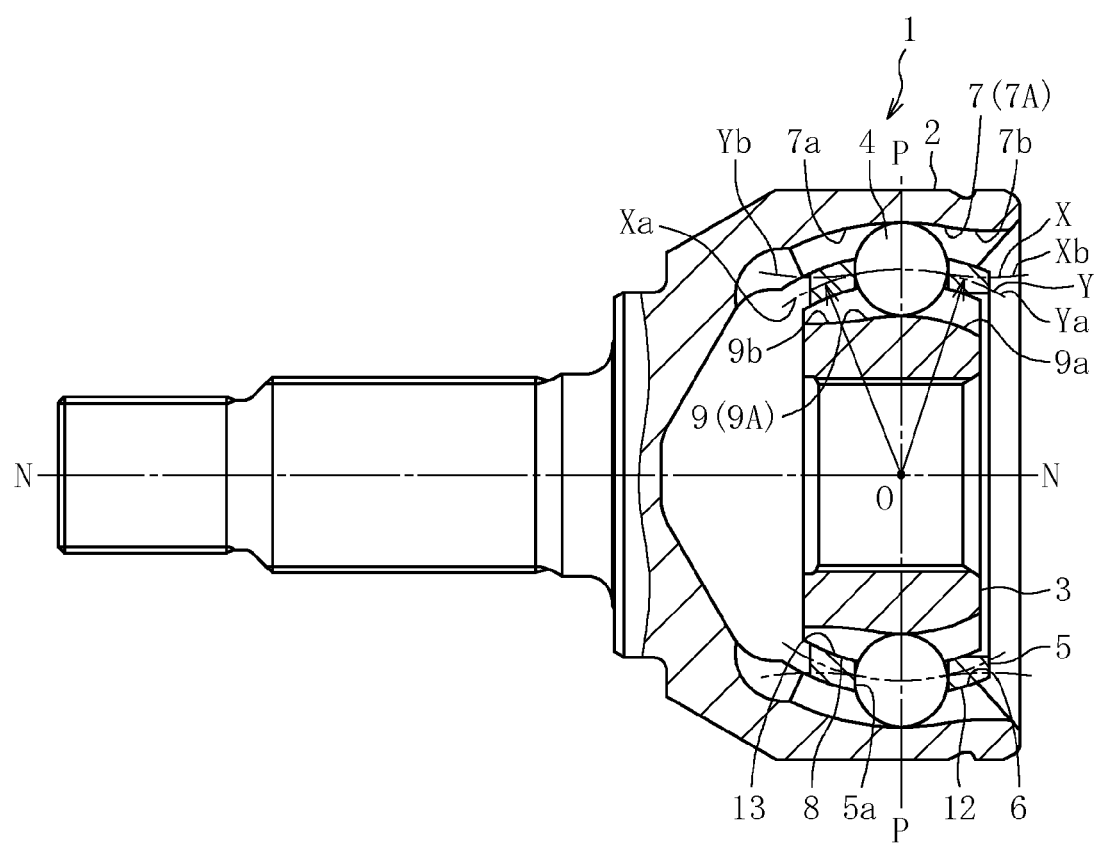
FIG. 12 is a partial vertical sectional view of an outer joint member of a fixed type constant velocity universal joint according to a fifth embodiment of the present invention.

As illustrated in FIG. 12, the fixed type constant velocity universal joint of this embodiment has substantially the same shape in vertical cross-section as that in the first embodiment, even for the shapes of the second track groove portions. FIG. 12 also illustrates the track grooves 7 and 9 under the state in which the cross-sections are rotated to the inclination angle γ=0° in the plane M illustrated in FIG. 2a and the plane Q illustrated in FIG. 3b. The track grooves 7 of the outer joint member 2 each have the ball-raceway center line X. The track grooves 7 each comprise the first track groove portion 7a having the circular-arc ball-raceway center line Xa about the joint center O as a curvature center, and the second track groove portion 7b having the circular-arc ball-raceway center line Xb curved in the direction opposite to that of the first track groove portion 7a. The ball-raceway center line Xb of the second track groove portion 7b is connected smoothly to the ball-raceway center line Xa of the first track groove portion 7a. On the other hand, the track grooves 9 of the inner joint member 3 each have the ball-raceway center line Y. The track grooves 9 each comprise the first track groove portion 9a having the circular-arc ball-raceway center line Ya about the joint center O as a curvature center, and the second track groove portion 9b having the circular-arc ball-raceway center line Yb curved in the direction opposite to that of the first track groove portion 9a. The ball-raceway center line Yb of the second track groove portion 9b is connected smoothly to the ball-raceway center line Ya of the first track groove portion 9a. In this way, the ball-raceway center lines Xa and Ya of the first track groove portions 7a and 9a and the ball-raceway center lines Xb and Yb of the second track groove portions 7b and 9b are different in shape from each other.

Figure 13:
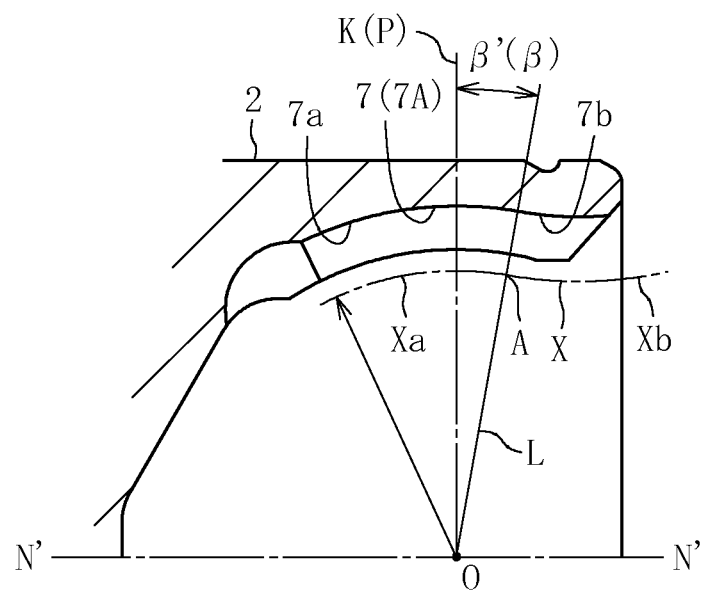
FIG. 13 is a vertical sectional view of the outer joint member of the fixed type constant velocity universal joint.
Figure 14:
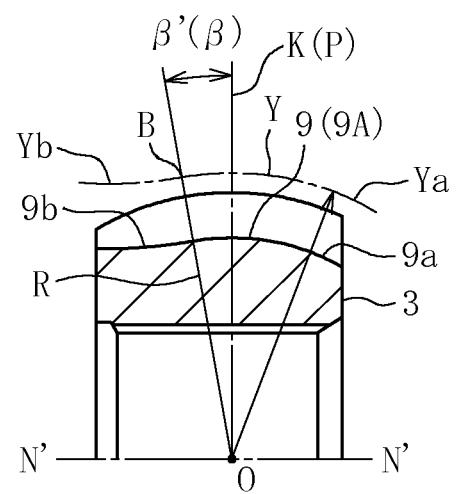
FIG. 14 is a vertical sectional view of an inner joint member of the fixed type constant velocity universal joint.

As illustrated in FIG. 13, the shape of the ball-raceway center line Xa of the first track groove portion 7a of the outer joint member 2 in a range up to the end portion A on the opening side is the same as that in the first embodiment. However, the ball-raceway center line Xb of the second track groove portion 7b is different from that of the first embodiment. The curvature center of the circular-arc ball-raceway center line Xb of the second track groove portion 7b of the outer joint member 2 of this embodiment is formed at a position (not shown) circumferentially out of the plane M (refer to FIG. 15) comprising the ball-raceway center line Xa of the track groove and the joint center O. Further, the ball-raceway center line Xb is formed with an appropriate curvature at which the ball-raceway center line Xb is connected smoothly to the end portion A on the opening side of the ball-raceway center line Xa of the first track groove portion 7a. The same applies to the ball-raceway center line Yb of the second track groove portion 9b of the inner joint member 3 illustrated in FIG. 14. The ball-raceway center line Y of the track groove 9 of the inner joint member 3 is formed to be mirror-image symmetrical with the ball-raceway center line X of the paired track groove 7 of the outer joint member 2 with respect to the plane P comprising the joint center O at the operating angle of 0°.

Figure 15:
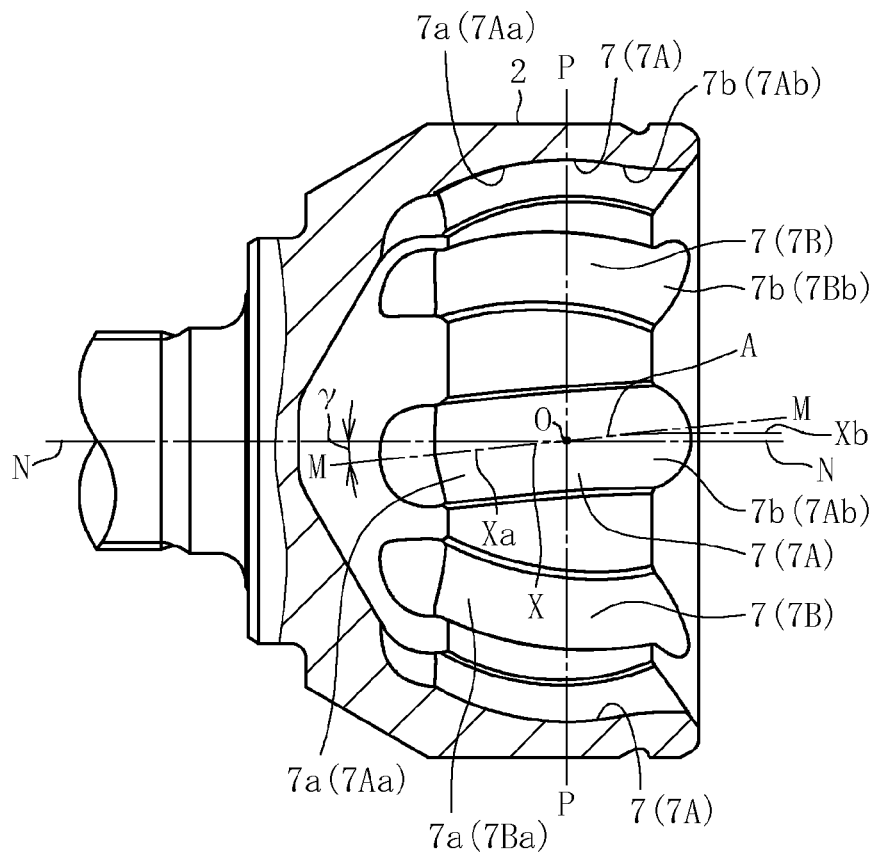
FIG. 15 is a partial vertical sectional view of an inner peripheral shape of the outer joint member of the fixed type constant velocity universal joint.

With reference to FIG. 15, description is made of a state in which the track grooves 7 of the outer joint member 2 are inclined in the circumferential direction with respect to the joint axial line N-N. The plane M comprising the ball-raceway center line Xa of the first track groove portion 7Aa of the outer joint member 2 and the joint center O is inclined at the angle γ with respect to the joint axial line N-N. On the other hand, for the first track groove portion 7Ba adjacent in the circumferential direction to the first track groove portion 7Aa, although not shown, another plane M comprising the ball-raceway center line Xa of the first track groove portion 7Ba and the joint center O is inclined at the angle γ in the direction opposite to the inclination direction of the first track groove portion 7Aa with respect to the joint axial line N-N. As described above, in this embodiment, only the first track groove portions 7Aa and 7Ba are each formed in the plane M. Further, in this embodiment, the ball-raceway center line Xb of the second track groove portion 7Ab is connected smoothly to the end portion A on the opening side of the ball-raceway center line Xa of the first track groove portion 7Aa. Then, the ball-raceway center line Xb of the second track groove portion 7Ab is gently curved in a manner that an inclination angle thereof becomes gradually lower toward the opening side, and the inclination angle reaches 0° near the opening rim portion. The ball-raceway center line Xb of the second track groove portion 7Bb inclined in the opposite direction is similarly formed.

Figure 16:
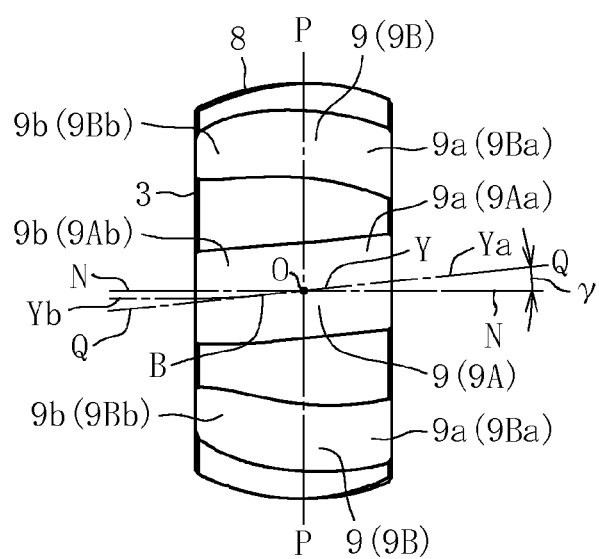
FIG. 16 is a view of an outer peripheral shape of the inner joint member of the fixed type constant velocity universal joint.
Figure 17B:
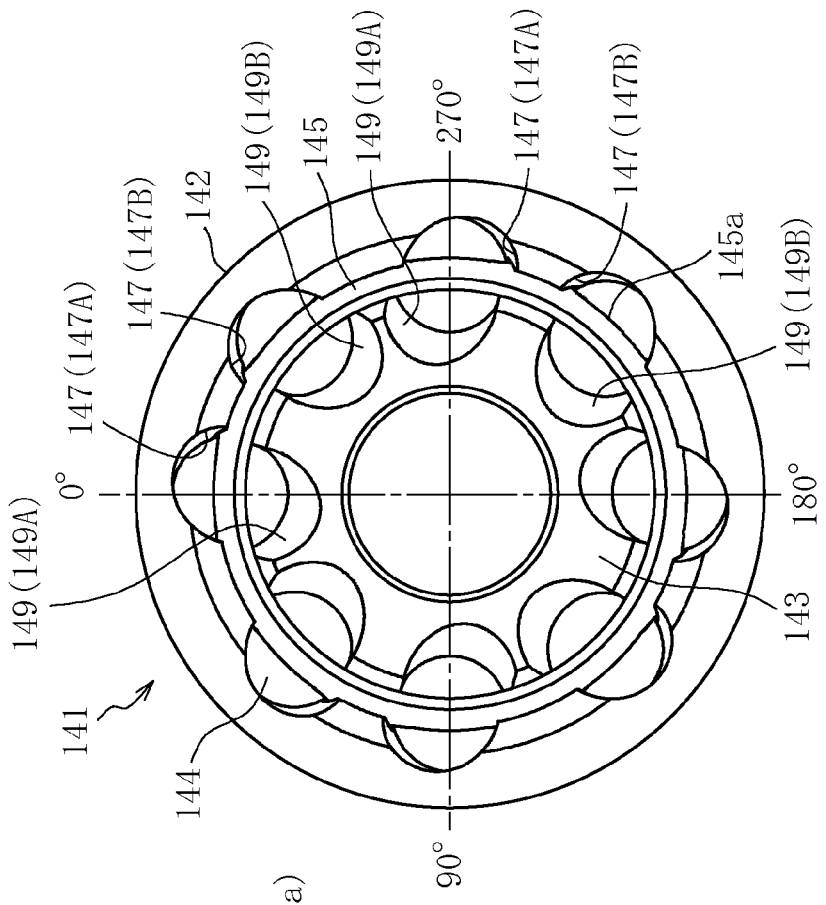
FIG. 17b is a side view of the fixed type constant velocity universal joint, for describing the technical findings in the course of the development of the present invention.
Figure 17A:
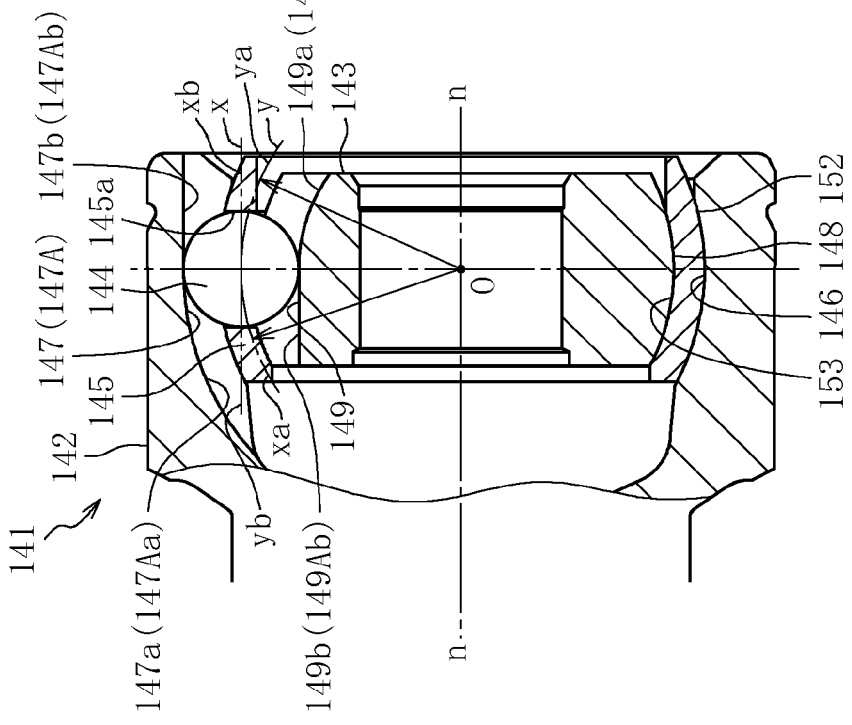
FIG. 17a is a vertical sectional view of a fixed type constant velocity universal joint, for describing technical findings in the course of development of the present invention.
Figure 18:
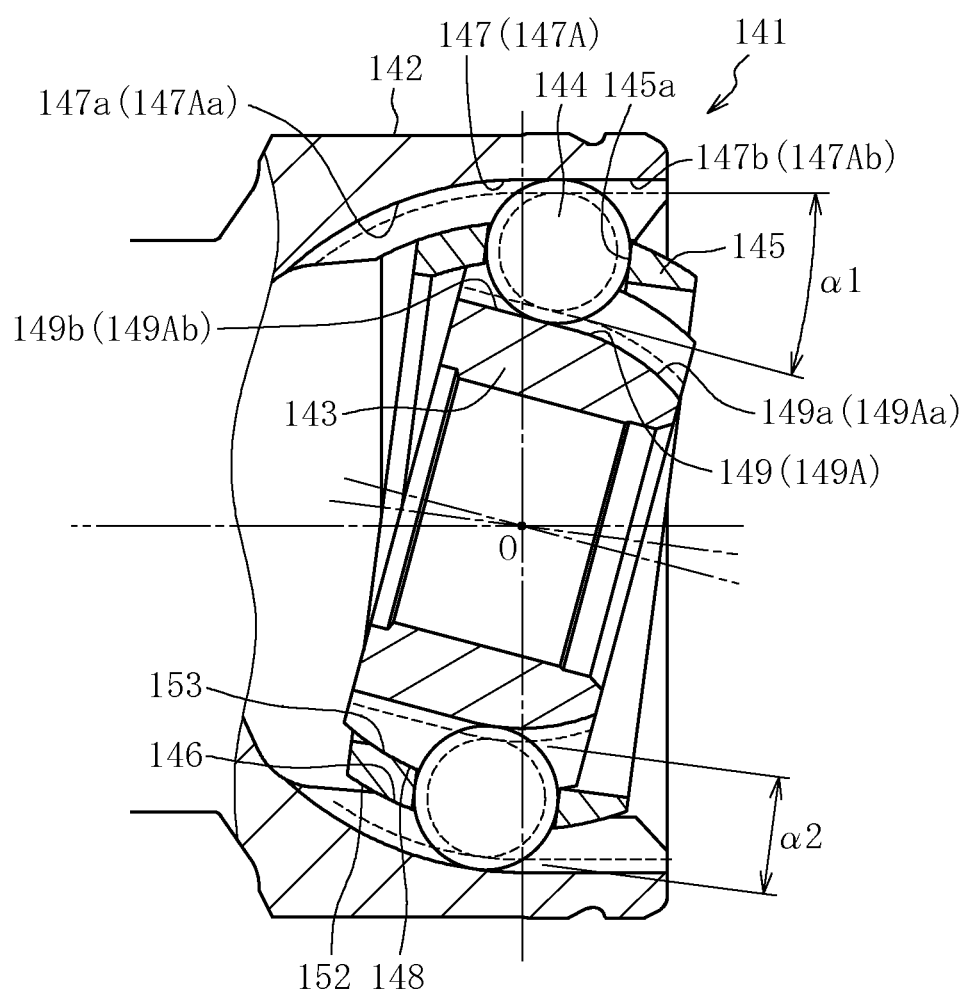
FIG. 18 is a view for describing the technical findings in the course of the development of the present invention.
Figure 19A:
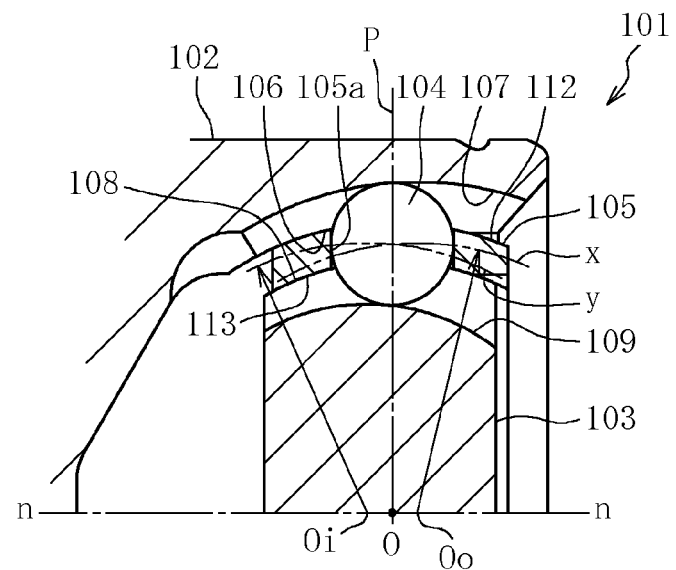
FIG. 19a is a vertical sectional view of a fixed type constant velocity universal joint according to a conventional technology.
Figure 19B:
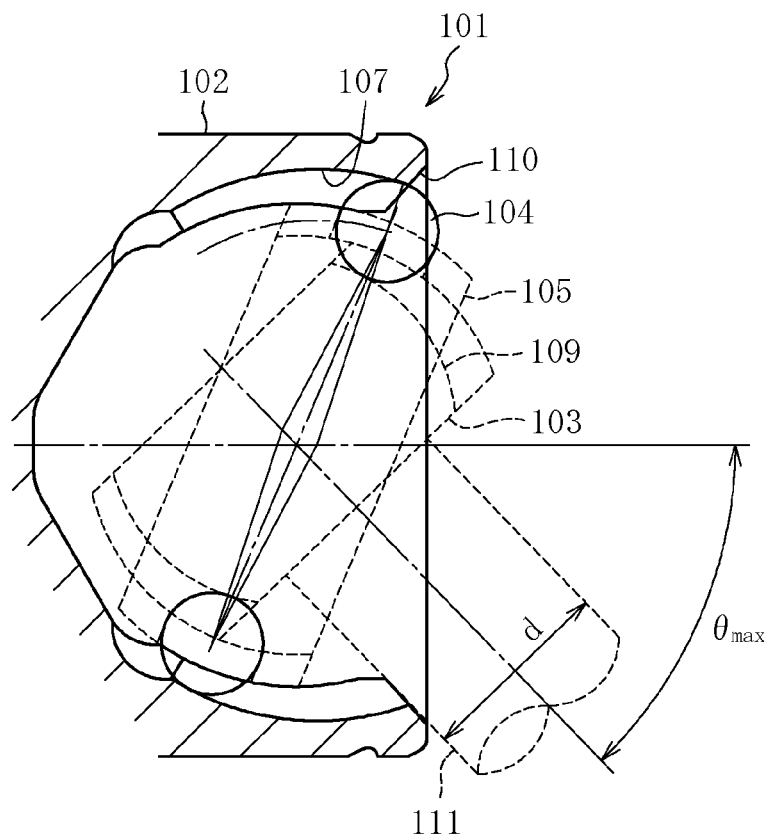
FIG. 19b is a schematic view illustrating a state in which the fixed type constant velocity universal joint according to the conventional technology forms a maximum operating angle.
Figure 20A:
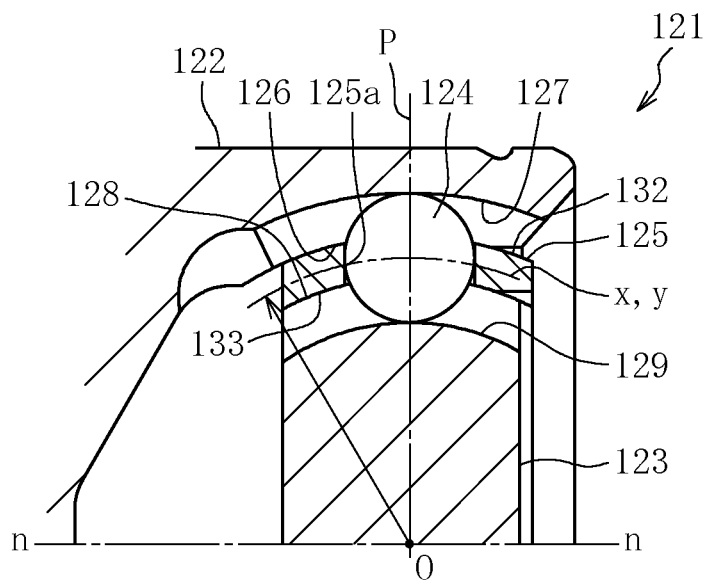
FIG. 20a is a vertical sectional view of a fixed type constant velocity universal joint according to another conventional technology.
Figure 20B:
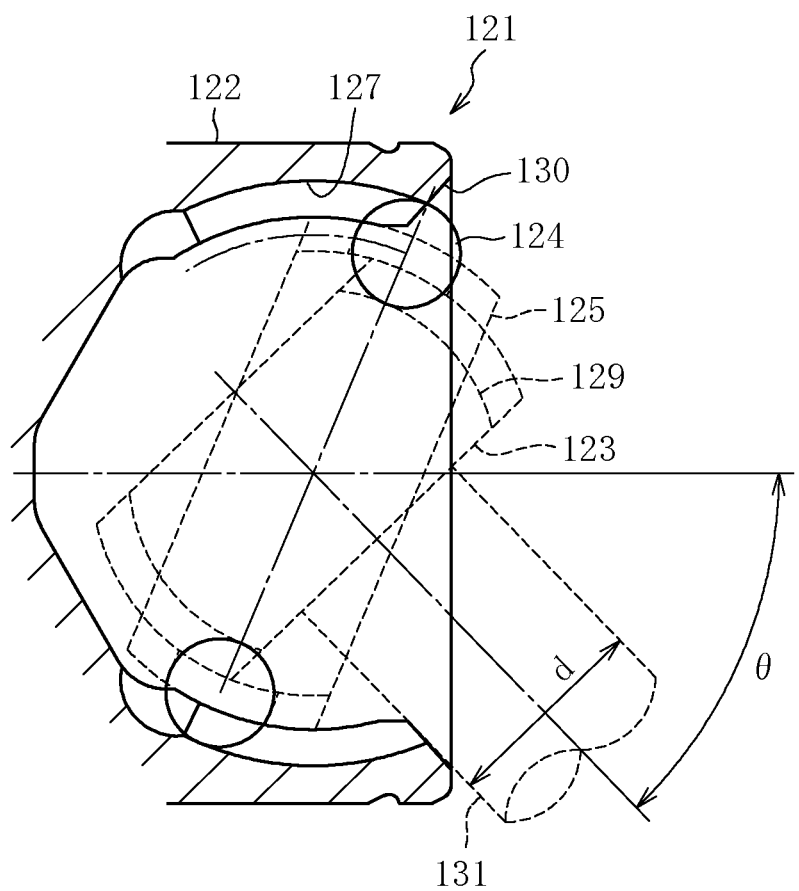
FIG. 20b is a schematic view illustrating a state in which the fixed type constant velocity universal joint according to the another conventional technology forms a high operating angle.

With reference to FIG. 16, description is made of a state in which the track grooves 9 of the inner joint member 3 are inclined in the circumferential direction with respect to the joint axial line N-N. The plane Q comprising the ball-raceway center line Ya of the first track groove portion 9Aa of the inner joint member 3 and the joint center O is inclined at the angle γ with respect to the joint axial line N-N. On the other hand, for the first track groove portion 9Ba adjacent in the circumferential direction to the first track groove portion 9Aa, although not shown, another plane Q comprising the ball-raceway center line Ya of the first track groove portion 9Ba and the joint center O is inclined at the angle γ in the direction opposite to the inclination direction of the first track groove portion 9Aa with respect to the joint axial line N-N. As well as the track grooves of the outer joint member 2 described above, the ball-raceway center line Yb of the second track groove portion 9Ab of the inner joint member 3 is connected smoothly to the end portion B on the depth side of the ball-raceway center line Ya of the first track groove portion 9Aa thereof. Then, the ball-raceway center line Yb of the second track groove portion 9Ab is gently curved in a manner that an inclination angle thereof becomes gradually lower toward the depth side, and the inclination angle reaches 0° near an end portion on the depth side. Note that, the ball-raceway center line Yb of the second track groove portion 9Bb inclined in the opposite direction is similarly formed.

As described above, the outer joint member 2 and the inner joint member 3 are provided with the second track groove portions 7Ab and 9Ab and the second track groove portions 7Bb and 9Bb, respectively. Thus, intervals on a closer side between the second track groove portions 7Ab and 7Bb adjacent to each other in the circumferential direction and between the second track groove portions 9Ab and 9Bb adjacent to each other in the circumferential direction are increased, and hence differences in intervals can be reduced in the circumferential direction. With this, differences in contact area on the opening side between the spherical inner peripheral surfaces 6 of the outer joint member 2 and differences in contact area on the depth side between the spherical outer peripheral surfaces 8 of the inner joint member 3 can be reduced. Thus, the spherical contact portions between the cage 5 and each of the outer joint member 2 and the inner joint member 3 can be arranged in a balanced manner. As a result, the fixed type constant velocity universal joint can be more smoothly operated.

In the fifth embodiment described above, the ball-raceway center line Xb of each of the second track groove portions 7Ab and 7Bb of the outer joint member 2 is connected smoothly to the end portion A on the opening side of the ball-raceway center line Xa of corresponding one of the first track groove portions 7Aa and 7Ba thereof. Then, the ball-raceway center line Xb is gently curved in a manner that the inclination angle thereof becomes gradually lower toward the opening side, and the inclination angle reaches 0° near the opening rim portion. On the other hand, the ball-raceway center line Yb of each of the second track groove portions 9Ab and 9Bb of the inner joint member 3 is connected smoothly to the end portion B on the depth side of the ball-raceway center line Ya of corresponding one of the first track groove portions 9Aa and 9Ba thereof. Then, the ball-raceway center line Yb is gently curved in a manner that the inclination angle thereof becomes gradually lower toward the depth side, and the inclination angle reaches 0° near the end portion on the depth side. However, the present invention is not limited thereto, and the following configuration may be employed. Specifically, the ball-raceway center line Xb of each of the second track groove portions 7Ab and 7Bb of the outer joint member 2 is formed into a circular arc having a relatively small curvature radius, and connected to the end portion A on the opening side of the ball-raceway center line Xa of corresponding one of the first track groove portions 7Aa and 7Ba. Then, the opening side is formed at the inclination angle of 0°. Similarly, the ball-raceway center line Yb of each of the second track groove portions 9Ab and 9Bb of the inner joint member 3 is formed into a circular arc having a relatively small curvature radius, and connected to the end portion B on the depth side of the ball-raceway center line Ya of corresponding one of the first track groove portions 9Aa and 9Ba. Then, the depth side is formed at the inclination angle of 0°.

In the fixed type constant velocity universal joint according to the embodiments described above, the number of the balls 4 is set to eight. However, the present invention is not limited thereto. Ten balls are also preferred, and twelve balls may also be appropriately applicable.

Further, in the fixed type constant velocity universal joint according to the embodiments described above, the ball-raceway center line Xb of the second track groove portion is formed into a circular-arc shape. However, the present invention is not limited thereto. Any other shapes, such as an elliptical shape and a straight shape, may be appropriately employed as long as the shapes are different from that of the ball-raceway center line Xa of the first track groove portion and an effective track length can be increased to form higher operating angles. Alternatively, the first track groove portion and the second track groove portion need not necessarily be formed of a single circular arc, and may be formed of a plurality of circular arcs in consideration, for example, of the track groove depths. Still further, the above-mentioned track grooves are arranged at a constant pitch in the circumferential direction, but may be arranged at an irregular pitch. Yet further, the above-mentioned inclination angles γ of the first track groove portions with respect to the joint axial line N-N are equal to each other in all the track grooves, but the present invention is not limited thereto. Alternatively, the inclination angle γ of a pair of the first track groove portions of the outer joint member and the inner joint member may be formed to be unequal to the inclination angle γ of another pair of the first track groove portions thereof. That is, it suffices that the inclination angles be set so that the forces of the balls are applied in a balanced manner as a whole in the axial direction to all the pocket portions in the circumferential direction of the cage. In addition, the track grooves and the balls are held in angular contact at a contact angle in the embodiments described above, but the present invention is not limited thereto. The track grooves and the balls may be held in circular contact by forming the track grooves into a circular shape in horizontal cross-section.

In summary of the embodiments according to the present invention described above, the fixed type constant velocity universal joint 1 comprises: the outer joint member 2 having: the spherical inner peripheral surface 6 provided with the plurality of track grooves 7 extending in the axial direction; and the opening side and the depth side spaced apart from each other in the axial direction; the inner joint member 3 having the spherical outer peripheral surface 8 provided with the plurality of track grooves 9 that are paired with the plurality of track grooves 7 of the outer joint member 2; the plurality of balls 4 for transmitting torque, the plurality of balls 4 being interposed between the plurality of track grooves 7 of the outer joint member 2 and the plurality of track grooves 9 of the inner joint member 3; and the cage 5 for holding the plurality of balls 4, the cage 5 having the spherical outer peripheral surface 12 and the spherical inner peripheral surface 13 that are fitted respectively to the spherical inner peripheral surface 6 of the outer joint member 2 and the spherical outer peripheral surface 8 of the inner joint member 3. The plurality of track grooves 7 of the outer joint member 2 comprise: the first track groove portions 7a each located on the depth side; and the second track groove portions 7b each located on the opening side. The first track groove portions 7a each comprise the circular-arc part having the curvature center that is prevented from being offset in the axial direction with respect to the joint center O. The first track groove portions 7a are inclined in the circumferential direction with respect to the joint axial line N-N, and are adjacent to each other in the circumferential direction with their inclination directions opposite to each other. The second track groove portions 7b are each formed into the shape different from the shape of each of the first track groove portions 7a so as to increase the effective track length with respect to the maximum operating angle. The first track groove portions 7a and the second track groove portions 7b are connected respectively to each other on the opening side with respect to the joint center O in the axial direction. Each of the plurality of track grooves 9 of the inner joint member 3 is formed to be mirror-image symmetrical with corresponding one of the plurality of paired track grooves 7 of the outer joint member 2 with respect to the plane P comprising the joint center O at the operating angle of 0°.

In further summary of the embodiments according to the present invention described above, the fixed type constant velocity universal joint 1 comprises: the outer joint member 2 having: the spherical inner peripheral surface 6 provided with the plurality of track grooves 7 extending in the axial direction; and the opening side and the depth side spaced apart from each other in the axial direction; the inner joint member 3 having the spherical outer peripheral surface 8 provided with the plurality of track grooves 9 that are paired with the plurality of track grooves 7 of the outer joint member 2; the plurality of balls 4 for transmitting torque, the plurality of balls 4 being interposed between the plurality of track grooves 7 of the outer joint member 2 and the plurality of track grooves 9 of the inner joint member 3; and the cage 5 for holding the plurality of balls 4, the cage 5 having the spherical outer peripheral surface 12 and the spherical inner peripheral surface 13 that are fitted respectively to the spherical inner peripheral surface 6 of the outer joint member 2 and the spherical outer peripheral surface 8 of the inner joint member 3. The plurality of track grooves 7 of the outer joint member 2 comprise: the first track groove portions 7a each located on the depth side; and the second track groove portions 7b each located on the opening side. The first track groove portions 7a each comprise the circular-arc ball-raceway center line Xa having the curvature center that is prevented from being offset in the axial direction with respect to the joint center O. The planes M defined in the first track groove portions 7a that are adjacent to each other in the circumferential direction, each comprising at least the circular-arc ball-raceway center line Xa and the joint center O, are inclined with respect to the joint axial line N-N with their inclination directions opposite to each other. The second track groove portions 7b each comprise the ball-raceway center line Xb formed into the shape different from the shape of the circular-arc ball-raceway center line Xa of each of the first track groove portions 7a. The circular-arc ball-raceway center line Xa of the each of the first track groove portions 7a comprises the end portion A located on the opening side with respect to the joint center O. The ball-raceway center line Xb of each of the second track groove portions 7b is connected to the end portion A. The plurality of track grooves 9 of the inner joint member 3 each have the ball-raceway center line Y formed to be mirror-image symmetrical with the ball-raceway center line X of corresponding one of the plurality of paired track grooves 7 of the outer joint member 2 with respect to the plane P comprising the joint center O at the operating angle of 0°.

The present invention is not limited to the above-mentioned embodiments. As a matter of course, the present invention may be carried out in various modes without departing from the spirit of the present invention. The scope of the present invention is described by claims, and encompasses the meaning equivalent to the description in the claims and all modifications within the scope.

DESCRIPTION OF REFERENCE SIGNS 1 fixed type constant velocity universal joint
2 outer joint member
3 inner joint member
4 ball
5 cage
6 spherical inner peripheral surface
7 track groove
7a first track groove portion
7b second track groove portion
8 spherical outer peripheral surface
9 track groove
9a first track groove
9b second track groove
11 shaft
12 spherical outer peripheral surface
13 spherical inner peripheral surface
20 drive shaft
A end portion
B end portion
C connecting point
$f_1$ offset amount $f_2$ offset amount
$f_3$ offset amount
K perpendicular line
L straight line
M plane comprising ball-raceway center line
N joint axial line
O joint center
P joint center plane
Q plane comprising ball-raceway center line
$O_{o1}$ curvature center
$O_{o2}$ curvature center
$O_{o3}$ curvature center
$O_{o4}$ curvature center
R straight line
X ball-raceway center line
Y ball-raceway center line
γ inclination angle
β angle
θ operating angle

The invention claimed is:

1. A fixed type constant velocity universal joint, comprising:
   an outer joint member having:
      a spherical inner peripheral surface provided with a plurality of track grooves extending in an axial direction; and
      an opening side and a depth side spaced apart from each other in the axial direction;
   an inner joint member having a spherical outer peripheral surface provided with a plurality of track grooves that are paired with the plurality of track grooves of the outer joint member;
   a plurality of balls for transmitting torque, the plurality of balls being interposed between the plurality of track grooves of the outer joint member and the plurality of track grooves of the inner joint member; and
   a cage for holding the plurality of balls, the cage having a spherical outer peripheral surface and a spherical inner peripheral surface that are fitted respectively to the spherical inner peripheral surface of the outer joint member and the spherical outer peripheral surface of the inner joint member,
   wherein each of the plurality of track grooves of the outer joint member comprises:
      a first track groove portion located on the depth side; and
      a second track groove portion located on the opening side,
   wherein the first track groove portions each comprise a circular-arc part having a curvature center that is prevented from being offset in the axial direction with respect to a joint center,
   wherein the first track groove portions are inclined in a circumferential direction with respect to a joint axial line, and adjacent pairs of the first track groove portions in the circumferential direction are inclined in opposite directions,
   wherein the second track groove portions each have a shape that is different from a shape of each of the first track groove portions,
   wherein the first track groove portions and the second track groove portions are connected respectively to each other on the opening side with respect to the joint center, and
   wherein each of the plurality of track grooves of the inner joint member is formed to be mirror-image symmetrical with a corresponding one of the plurality of track grooves of the outer joint member with respect to a plane comprising the joint center at an operating angle of 0°.

2. A fixed type constant velocity universal joint according to claim 1,
   wherein the circular-arc part of each of the first track groove portions comprises a circular-arc ball-raceway center line having a curvature center that is prevented from being offset in the axial direction with respect to the joint center,
   wherein, for each of the first track groove portions, a plane comprising at least the circular-arc ball-raceway center line of the first track groove portion and the joint center is inclined with respect to the joint axial line,
   wherein the second track groove portions each comprise a ball-raceway center line having a shape different from a shape of the circular-arc ball-raceway center line of each of the first track groove portions,
   wherein the circular-arc ball-raceway center line of each of the first track groove portions comprises an end portion located on the opening side with respect to the joint center,
   wherein the ball-raceway center line of each of the second track groove portions is connected to the end portion of a corresponding one of the circular-arc ball-raceway center lines of the first track groove portions, and
   wherein the plurality of track grooves of the inner joint member each have a ball-raceway center line formed to be mirror-image symmetrical with a ball-raceway center line of a corresponding one of the plurality of track grooves of the outer joint member with respect to the plane comprising the joint center at the operating angle of 0°.

3. A fixed type constant velocity universal joint according to claim 2, wherein an angle formed by a straight line connecting the joint center and a point at which one of the first track groove portions and a corresponding one of the second track groove portions are connected to each other with respect to the plane comprising the joint center at the operating angle of 0° is set to range from 3° to 10°.

4. A fixed type constant velocity universal joint according to claim 2, wherein the curvature center of the circular-arc ball-raceway center line of each of the first track groove portions is arranged on the joint axial line.

5. A fixed type constant velocity universal joint according to claim 2, wherein the curvature center of the circular-arc ball-raceway center line of each of the first track groove portions is offset in a radial direction with respect to the joint axial line.

6. A fixed type constant velocity universal joint according to claim 2, wherein the spherical outer peripheral surface and the spherical inner peripheral surface of the cage each have a curvature center that is offset in the axial direction with respect to the joint center.

7. A fixed type constant velocity universal joint according to claim 2, wherein the ball-raceway center line of each of the second track groove portions comprises a circular-arc part.

8. A fixed type constant velocity universal joint according to claim 7, wherein the circular-arc part of the ball-raceway center line of each of the second track groove portions has a curvature center located outside of the circular-arc ball-raceway center line of the corresponding one of the first track groove portions in the radial direction and is offset to the opening side with respect to the joint center.

9. A fixed type constant velocity universal joint according to, claim 8, wherein the curvature center of the circular-arc part of the ball-raceway center line of each of the second track groove portions is formed at a position off of the plane comprising the circular-arc ball-raceway center line of the corresponding one of the first track groove portions and the joint center.

10. A fixed type constant velocity universal joint according to claim 2,
    wherein the ball-raceway center line of each of the second track groove portions comprises a circular-arc part and a straight part, and
    wherein a part of the ball-raceway center line that corresponds to the straight part of each of the second track groove portions is connected smoothly to the end portion on the opening side of the circular-arc ball-raceway center line of a corresponding one of the first track groove portions.

11. A fixed type constant velocity universal joint according to claim 2, wherein an inclination angle of the ball-raceway center line of each of the second track groove portions becomes gradually lower toward the opening side.

12. A fixed type constant velocity universal joint according to claim 2, wherein the plurality of balls is eight balls.

13. A fixed type constant velocity universal joint according to claim 1, wherein the shape of each of the second track groove portions that is different from the shape of each of the first track groove portions increases an effective track length with respect to a maximum operating angle as compared to an effective track length of the plurality of track grooves of the outer joint member with respect to the maximum operating angle if the second track groove portions were replaced with a continuation of the first track groove portions.

* * * * *